(12) United States Patent
Ueno et al.

(10) Patent No.: US 12,534,653 B2
(45) Date of Patent: Jan. 27, 2026

US012534653B2

(54) POLYMER COMPOSITION FOR LAMINATION AND LAMINATED BODY USING SAME

(71) Applicant: JAPAN POLYETHYLENE CORPORATION, Tokyo (JP)

(72) Inventors: Masahiro Ueno, Kanagawa (JP); Makoto Yanagie, Kanagawa (JP); Masahiro Uematsu, Saitama (JP)

(73) Assignee: JAPAN POLYETHYLENE CORPORATION, Tokyo (JP)

( * ) Notice: Subject to any disclaimer, the term of this patent is extended or adjusted under 35 U.S.C. 154(b) by 1061 days.

(21) Appl. No.: 17/622,942

(22) PCT Filed: Jun. 23, 2020

(86) PCT No.: PCT/JP2020/024574
§ 371 (c)(1),
(2) Date: Dec. 27, 2021

(87) PCT Pub. No.: WO2020/262369
PCT Pub. Date: Dec. 30, 2020

(65) Prior Publication Data
US 2022/0251430 A1 Aug. 11, 2022

(30) Foreign Application Priority Data
Jun. 24, 2019 (JP) .................................. 2019-116697

(51) Int. Cl.
*C09J 133/08* (2006.01)
*C09J 7/38* (2018.01)

(52) U.S. Cl.
CPC ............. *C09J 133/08* (2013.01); *C09J 7/385* (2018.01); *C09J 2423/04* (2013.01); *C09J 2433/00* (2013.01)

(58) Field of Classification Search
CPC ...... C09J 133/08; C09J 7/385; C09J 2423/04; C09J 2433/00; B32B 15/085; B32B 15/09; B32B 27/32; B32B 2255/06; B32B 2307/30; B32B 2307/31; B32B 2307/558; B32B 15/20; B32B 27/36; B32B 2307/54; B32B 2307/704; B32B 2307/748; B32B 27/18; B32B 2553/00; C08F 210/02; C08F 8/44; C08L 23/0869; C08L 23/0807; C08L 2207/066

See application file for complete search history.

(56) References Cited

U.S. PATENT DOCUMENTS

| | | | |
|---|---|---|---|
| 3,264,272 A | 8/1966 | Rees et al. | |
| 2011/0213110 A1 | 9/2011 | Shimizu et al. | |
| 2017/0306134 A1 | 10/2017 | Hattori et al. | |
| 2019/0092985 A1* | 3/2019 | Uematsu | B32B 15/08 |
| 2019/0292423 A1 | 9/2019 | Perez et al. | |
| 2022/0135718 A1* | 5/2022 | Uematsu | C08F 220/1804 |
| | | | 526/146 |

FOREIGN PATENT DOCUMENTS

| | | |
|---|---|---|
| EP | 3 936 535 A1 | 1/2022 |
| JP | 2016-079408 | 5/2016 |
| WO | 2010/050256 | 5/2010 |
| WO | 2018/094197 A1 | 5/2018 |

OTHER PUBLICATIONS

Extended European Search Report issued in EP Patent Application No. 20831975.6, Jun. 23, 2023.
ISR issued in International Patent Application No. PCT/JP2020/024574, Sep. 15, 2020, translation.

* cited by examiner

*Primary Examiner* — Kumar R Bhushan
(74) *Attorney, Agent, or Firm* — GREENBLUM & BERNSTEIN, P.L.C.

(57) ABSTRACT

A polymer composition for lamination characterized in that the composition consists of (X1) 100 to 60% by weight of an ionomer characterized in that at least a part of a carboxyl group and/or a dicarboxylic anhydride group in a copolymer (P) containing a structural unit (A) derived from ethylene and/or an α-olefin having 3 to 20 carbon atoms and a structural unit (B) derived from a monomer having a carboxyl group and/or a dicarboxylic anhydride group as essential constitutional units being converted into a metal-containing carboxylic acid salt containing at least one kind of a metal ion(s) selected from Group 1, Group 2 or Group 12 of the periodic table, and a phase angle δ of the ionomer at an absolute value G*=0.1 MPa of a complex modulus of elasticity measured by a rotary rheometer is a range of 50 degrees to 75 degrees, and (X2) 40 to 0% by weight of an ethylene-based copolymer.

12 Claims, 1 Drawing Sheet

POLYMER COMPOSITION FOR LAMINATION AND LAMINATED BODY USING SAME

TECHNICAL FIELD

The present invention relates to a polymer composition for lamination using a novel ionomer and a laminated body using the same.

BACKGROUND ART

Heretofore, as a base material for packaging, a polyamide resin, a polyethylene terephthalate resin, a polypropylene resin, etc., which are excellent in transparency and mechanical strength have been used. However, these resins have problems that they have high heat-sealing temperatures, the packaging speed cannot be increased, the film shrinks at the time of heat-sealing to worsen packaging appearance, and heat-sealing strength is low, etc. Therefore, it is rare that these base materials are used alone, and usually used is a composite film in which these base materials are used as a base material for lamination, and a heat-sealing layer obtained by laminating a polyethylene-based resin, etc., is provided thereon. For example, as a base material for liquid packaging, it has been known a composite film in which a sealant layer is provided on a surface base material layer, or a film for packaging obtained by laminating various kinds of intermediate layers on a base material and further laminating a sealant layer thereon.

On the other hand, the ethylene-based ionomer is a resin using an ethylene-unsaturated carboxylic acid copolymer as a base resin, and intermolecularly bonded with metal ions such as sodium, zinc, and the like (U.S. Pat. No. 3,264,272), It has characteristics of having tough, high elasticity and flexibility, and wear resistance, and transparency, etc.

At present, as a commercially available ethylene-based ionomer, it has been known "Surlyn (Registered Trademark)" which is a sodium salt or zinc salt of an ethylene-methacrylic acid copolymer developed by Dupont, and "Himilan (Registered Trademark)" sold by Dow-Mitsui Polychemicals Co., Ltd., and the like.

In the ethylene-unsaturated carboxylic acid copolymers which are a base resin used for the ethylene-based ionomers currently commercially sold, a polar group-containing olefin copolymer in which a polar group-containing monomer such as ethylene and an unsaturated carboxylic acid, etc., are polymerized by the high-pressure radical polymerization method is used in each case. The high-pressure radical polymerization method has a merit that polymerization is possible at a low cost and relatively without selecting the kind of the polar group-containing monomer. However, the molecular structure of this polar group-containing olefin copolymer produced by the high-pressure radical polymerization method has a multi-branched type molecular structure in which it has many long-chain branches and short-chain branches irregularly as shown in the image diagram shown in FIG. 1, and it has a drawback that it is insufficient in strength.

On the other hand, it has conventionally been sought a method for producing a polar group-containing olefin copolymer in which the molecular structure is a linear state using a polymerization method which uses a catalyst, as shown in the image diagram shown in FIG. 2, but the polar group-containing monomer generally becomes catalytic poisons so that its polymerization is difficult, and in fact, it has been deemed to be difficult for long years to obtain a polar group-containing olefin copolymer having desired physical properties by an industrially inexpensive and stable Method.

However, in recent years, a method for obtaining a polar group-containing olefin copolymer having a substantially linear state molecular structure industrially low cost and stably has been proposed using a novel catalyst and a novel producing method developed by the applicant of the present application, etc.

And, it has been proposed by the applicant of the present application, etc., that, as a producing method of a polar group-containing olefin copolymer which becomes a base resin of the ethylene-based ionomer, it has been reported to succeed in producing a binary ionomer by producing a copolymer of ethylene and t-butyl acrylate using a late-period transition metal catalyst, and after modifying the obtained polar group-containing olefin copolymer to an ethylene-acrylic acid copolymer by subjecting to a heat or acid treatment, reacting with a metal ion (JP 2016-79408A).

PRIOR ART DOCUMENTS

Patent Documents

Patent document 1: U.S. Pat. No. 3,264,272
Patent document 2: JP 2016-79408A.

SUMMARY OF THE INVENTION

Problems to be Solved by the Invention

As a polymer for lamination which forms a sealant layer, etc., of the composite film, low-density polyethylene (LDPE), ethylene-vinyl acetate copolymer (EVA), etc., have initially been used. However, the LDPE film has drawbacks in low temperature heat-sealing property, heat resistance and hot tack property, etc., and EVA has drawbacks in heat resistance and hot tack property, etc. Also, the conventionally known ethylene-based ionomer having a multi-branched molecular structure lacks strength, and as the present inventors have clarified, it has drawbacks in heat-sealing properties, particularly in hot tack strength. If the hot tack strength is low, the contents cannot be filled in a molten state immediately after sealing, etc., which affect the packaging speed and processability.

In view of the situation of such a prior art, an object of the present application is to provide a polymer resin composition for lamination and a laminated body using an ionomer excellent in processability and excellent in hot tack strength.

Means to Solve the Problems

Ethylene-based ionomers as described in JP 2016-79408A are novel ethylene-based ionomer which has conventionally never been exist in which the base resin has a substantially linear state molecular structure and also has a function as an ionomer, and the physical properties, etc., thereof are markedly different from the conventional ethylene-based ionomers, and its specific characteristics and suitable applications are unknown.

The present inventors have earnestly studied to solve the above-mentioned problems, and as a result, they have found that by using a resin composition containing an ethylene-based ionomer in which an ester group of an ethylene/unsaturated carboxylic ester copolymer obtained by using a later mentioned transition metal catalyst from ethylene and an unsaturated carboxylic ester has been converted into a metal-containing carboxylic acid salt, a polymer resin composition for lamination excellent in processability can be obtained, and by using the polymer resin composition for lamination for a sealant layer of a laminated body, a laminated body excellent in heat-sealing properties than a polar group-containing olefin copolymer-based ionomer obtained by the conventional high-pressure radical polymerization method, in particular, excellent in hot tack properties can be obtained, whereby they have accomplished the present invention.

That is, the present invention is as shown by the following [1] to [13].

[1] It is a polymer composition for lamination characterized in that the composition consists of (X1) 100 to 60% by weight of an ionomer characterized in that at least a part of a carboxyl group and/or a dicarboxylic anhydride group in a copolymer (P) containing a structural unit (A) derived from ethylene and/or an α-olefin having 3 to 20 carbon atoms and a structural unit (B) derived from a monomer having a carboxyl group and/or a dicarboxylic anhydride group as essential constitutional units being converted into a metal-containing carboxylic acid salt containing at least one kind of a metal ion(s) selected from Group 1, Group 2 or Group 12 of the periodic table, and a phase angle δ of the ionomer at an absolute value G*=0.1 MPa of a complex modulus of elasticity measured by a rotary rheometer is a range of 50 degrees to 75 degrees, and (X2) 40 to 0% by weight of an ethylene-based copolymer containing ethylene by high-pressure radical polymerization as an essential monomer, and has a melt flow rate of 1.0 to 100 g/10 min.

[2] it is a polymer composition for lamination characterized in that the composition consists of (X1) 100 to 60% by weight of an ionomer characterized in that the ionomer comprises a copolymer (P) containing a structural unit (A) derived from ethylene and/or an α-olefin having 3 to 20 carbon atoms and a structural unit. (B) derived from a monomer having a carboxyl group and/or a dicarboxylic anhydride group as essential constitutional units, and further containing, other than the structural unit (A) and the structural unit (B), a structural unit (C) which is a compound having one or more carbon-carbon double bond in a molecular structure, and at least a part of a carboxyl group and/or a dicarboxylic anhydride group being converted into a metal-containing carboxylic acid salt containing at least one kind of a metal ion(s) selected from Group 1, Group 2 or Group 12 of the periodic table, and a phase angle δ of the ionomer at an absolute value G*=0.1 MPa of a complex modulus of elasticity measured by a rotary rheometer is a range of 50 degrees to 75 degrees, and (X2) 40 to 0% by weight of an ethylene-based copolymer containing ethylene by high-pressure radical polymerization as an essential monomer, and has a melt flow rate of 1.0 to 100 g/10 min.

[3] It is the polymer composition for lamination described in [2] characterized in that the structural unit (C) in the copolymer (P) is a non-cyclic monomer represented by the following general formula (1) or a cyclic monomer represented by the following general formula (2).

[Formula 1]

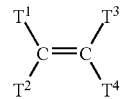

(1)

[in the general formula (I), $T^1$ to $T^3$ each independently represents a substituent selected from the group consisting of a hydrogen atom, a hydrocarbon group having 1 to 20 carbon atoms, a hydrocarbon group having 1 to 20 carbon atoms substituted by a hydroxyl group, a hydrocarbon group having 2 to 20 carbon atoms substituted by an alkoxy group having 1 to 20 carbon atoms, a hydrocarbon group having 3 to 20 carbon atoms substituted by an ester group having 2 to 20 carbon atoms, a hydrocarbon group having 1 to 20 carbon atoms substituted by a halogen atom, an alkoxy group having 1 to 20 carbon atoms, an aryl group having 6 to 20 carbon atoms, an ester group having 2 to 20 carbon atoms, a silyl group having 3 to 20 carbon atoms, a halogen atom and a cyano group, and $T^4$ represents a substituent selected from the group consisting of a hydrocarbon group having 1 to 20 carbon atoms substituted by a hydroxyl group, a hydrocarbon group having 2 to 20 carbon atoms substituted by an alkoxy group having 1 to 2.0 carbon atoms, a hydrocarbon group having 3 to 20 carbon atoms substituted by an ester group having 2 to 20 carbon atoms, a hydrocarbon group having 1 to 20 carbon atoms substituted by a halogen atom, an alkoxy group having 1 to 20 carbon atoms, an aryl group having 6 to 20 carbon atoms, an ester group having 2 to 20 carbon atoms, a silyl group having 3 to 20 carbon atoms, a halogen atom and a cyano group.]

[Formula 2]

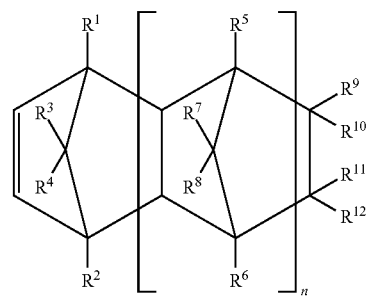

(2)

[in the general formula (2), $R^1$ to $R^{12}$ each may be the same or different from each other, and each is selected from the group consisting of a hydrogen atom, a halogen atom and a hydrocarbon group having 1 to 20 carbon atoms, $R^9$ and $R^{10}$, and, $R^{11}$ and $R^{12}$ may be each integrated to form a divalent organic group, and $R^9$ or $R^{10}$, and $R^{11}$ or $R^{12}$ may form a ring with each other.

Also, n indicates 0 or a positive integer, and when n is 2 or more, $R^5$ to $R^8$ may be the same or different from each other in each repeating unit.]

[4] It is the polymer composition for lamination described in [3] characterized in that the structural unit (Cl in the copolymer (P) is the non-cyclic monomer represented by the above-mentioned general formula (1).

[5] It is the polymer composition for lamination described in [3] characterized in that the structural unit (C) in the copolymer (P) is the cyclic monomer represented by the above-mentioned general formula (2).

[6] It is the polymer composition for lamination described in any of [1] to [5] characterized in that a number of methyl branches calculated by $^{13}$C-NMR of the copolymer (P) is 50 or less per 1,000 carbons.

[7] It is the polymer composition for lamination described in any of [1] to [5] characterized in that a number of methyl branches calculated by $^{13}$C-NMR of the copolymer (P) is 5 or less per 1,000 carbons.

[8] It is the polymer composition for lamination described in any of [1] to [7] characterized in that the copolymer (P) contains 2 to 20 mol % of the structural unit (B) in the copolymer.

[9] It is the polymer composition for lamination described in any of [1] to [8] characterized in that the structural unit (A) is a structural unit derived from ethylene.

[10] It is the polymer composition for lamination described in any of [1] to [9] characterized in that the copolymer (P) is produced by using a transition metal catalyst containing a transition metal(s) of Group 8 to 11 of the periodic table.

[11] It is the polymer composition for lamination described in [10] characterized in that the transition metal catalyst is a transition metal catalyst comprising phosphorus sulfonic acid or phosphorus phenol ligand and nickel or palladium.

[12] It is the polymer composition for lamination described in any of [1] to [11] characterized in that the (X2) ethylene-based copolymer by high-pressure radical polymerization is an ethylene homopolymer.

[13] A laminated body which is a laminated body constituted by at least a first layer composed of a base material layer and a second layer composed of a sealant layer, wherein the sealant layer comprises the polymer composition for lamination described in any of [1] to [12].

Effects of the Invention

The polymer resin composition for lamination using the ionomer of the present invention, which has a substantially linear structure, is markedly excellent in heat-sealing properties, in particular, hot tack properties as compared with a polar group-containing olefin copolymer based ionomer obtained by the conventional high-pressure radical polymerization method. When the resin composition is used as a sealant layer, a laminated body having excellent heat-sealing properties, in particular, good hot tack properties can be obtained. According to this, it is possible to increase the cycle in the heat-sealing step, and also possible to reduce a volume and cost by reducing a gauge of the sealant layer, etc., whereby it is possible to heighten properties as a packaging material.

EMBODIMENTS TO CARRY CUT THE INVENTION

Figure 1:
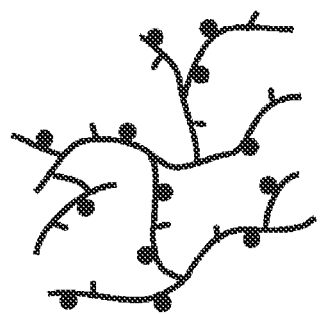
FIG. 1 is an image diagram of a multi-branched molecular structure of a polar group-containing olefin copolymer produced by the high-pressure radical polymerization method. Circles in the figure represent polar groups.
Figure 2:
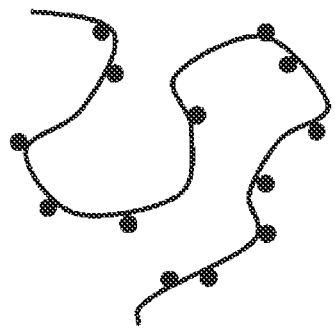
FIG. 2 is an image diagram of a polar group-containing olefin copolymer in which the molecular structure is linear. Circles in the figure represent polar groups.

The present invention is directed to
a resin composition which comprises (X1) 100 to 60% by weight of an ionomer comprising a copolymer (P) as a base resin in which a structural unit (A) derived from ethylene and/or an α-olefin having 3 to 20 carbon atoms and a structural unit (B) derived from a monomer having a carboxyl group and/or a dicarboxylic anhydride group as essential constitutional units, and, if necessary, further a structural unit (C) which is a compound having one or more carbon-carbon double bond in a molecular structure, are contained as constitutional units, and at least a part of a carboxyl group and/or a dicarboxylic anhydride group of the structural unit (B) is converted into a metal-containing carboxylic acid salt containing at least one kind of a metal ion(s) selected from Group 1, Group 2 or Group 12 of the periodic table, and
(X2) 40 to 0% by weight of an ethylene-based copolymer containing ethylene by high-pressure radical polymerization as an essential monomer,
a polymer composition for lamination which composition comprises having a melt flow rate of 1.0 to 100 g/10 min, and a laminated body using the same.

Hereinafter, the ionomer, the polymer resin composition for lamination using the ionomer, and the laminated body using the same, the uses thereof; etc., according to the present invention will be explained in detail for each item. Incidentally, in the present specification, "(meth)acrylic acid" means acrylic acid or methacrylic acid. Also, in the present specification, "to" indicating a numerical range is used to mean that the numerical values described before and after the numerical range are included as the lower limit value and the upper limit value. Further, in the present specification, the copolymer means a copolymer of binary or more containing at least one kind of a unit (A) and at least one kind of a unit (B).

Also, in the present specification, the ionomer means an ionomer of binary or more of the copolymer, which contains the above-mentioned structural unit (A) and a structural unit (B') in which at least a part of the above-mentioned structural unit (B) is converted into a metal-containing carboxylic acid salt, and which may further contain the above-mentioned structural unit (B).

1. Ionomer

The ionomer which is Component (X1) of the present invention is characterized in that it contains the structural unit (A) derived from ethylene and/or an α-olefin having 3 to 20 carbon atoms, and the structural unit (B) derived from the monomer having a carboxyl group and/or a dicarboxylic anhydride group as essential constitutional units, and further, if necessary, contains the structural unit (C) which is a compound having one or more carbon-carbon double bond in the molecular structure, a copolymer (P) in which they are substantially copolymerized linearly, preferably, random copolymerized as a base resin, and at least a part of the carboxyl group and/or the dicarboxylic anhydride group of the structural unit (B) is/are converted into a metal-containing carboxylic acid salt containing at least one kind of a metal ion(s) selected from Group 1, Group 2 or Group 12 of the periodic table.

(1) Structural Unit (A)

The structural unit (A) is at least one kind of a structural unit(s) selected from the group consisting of a structural unit derived from ethylene and a structural unit derived from an α-olefin having 3 to 20 carbon atoms.

The α-olefin according to the present invention is an α-olefin having 3 to 20 carbon atoms represented by the structural formula: $CH_2=CHR^{18}$ ($R^{18}$ is a hydrocarbon group having 1 to 18 carbon atoms, which may be a linear structure or may have a branch). The number of the carbon atoms of the α-olefin is more preferably 3 to 12.

Specific examples of the structural unit (A) may be mentioned ethylene, propylene, 1-butene, 1-pentene, 1-hexene, 1-octene, 1-decene, 3-methyl-1-butene, and 4-methyl-1-pentene, etc., and it may be ethylene. As the ethylene, in addition to that derived from a petroleum raw material, ethylene derived from a non-petroleum raw material such as that derived from a plant raw material can be used.

Also, the structural unit (A) may be one kind, or may be a plural kind.

As a combination of two kinds, there may be mentioned, for example, ethylene-propylene, ethylene-1-butene, ethylene-1-hexene, ethylene-1-octene, propylene-1-butene, propylene-1-hexene, and propyl ene-1-o etc-no, etc.

As a combination of three kinds, there may be mentioned, for example, ethylene-propylene-1-butene, ethyl ene-propylene-1-hexene, ethyl ene-propylene-1-octene, propylene-1-butene-hexene, and propylene-1-butene-1-octene, etc.

In the present invention, as the structural unit (A), it preferably contains ethylene as indispensable, and if necessary, one or more kinds of an α-olefin(s) having 3 to 20 carbon atoms may be further contained.

The ethylene in the structural unit (A) may be 65 to 100 mol % based on the total mol of the structural unit (A), and may be 70 to 100 mol %.

From the viewpoint of impact resistance, the above-mentioned structural unit (A) may be a structural unit derived from ethylene.

(2) Structural Unit (B)

The structural unit (B) is a structural unit derived from a monomer having a carboxyl group and/or a dicarboxylic anhydride group. Incidentally, the structural unit (B) represents that it has the same structure as the structural unit derived from the monomer having a carboxyl group and/or a dicarboxylic anhydride group, and as mentioned in the production method mentioned later, it is not necessarily a material produced by using a monomer having a carboxyl group and/or a dicarboxylic anhydride group.

As the structural unit derived from the monomer having a carboxyl group, there may be mentioned, for example, an unsaturated carboxylic acid such as acrylic acid, methacrylic acid, maleic acid, fumaric acid, tetrahydroplithalic acid, itaconic acid, citraconic acid, crotonic acid, isocrotonic acid, norbornenedicarboxylic acid, bicyclo-[2,2,1]hept-2-ene-5,6-dicarboxylic acid, etc., and as the structural unit derived from the monomer having a dicarboxylic anhydride group, there may be mentioned, for example, an unsaturated dicarboxylic anhydride such as maleic anhydride, itaconic anhydride, citraconic anhydride, tetrahydroplithalic anhydride, 5-norbomene-2,3-dicarboxylic anhydride, 3,6-epoxy-1,2,3,6-tetrahydrophthatic anhydride, tetracyclo[$6.2.1.1^{3,6}0.0^{2,7}$]-dodeca-9-ene-4,5-dicarboxylic anhydride, 2,7-octadien-1-ylsuccinic anhydride, etc.

As the structural unit derived from the monomer having a carboxyl group and/or a dicarboxylic anhydride group, there may be preferably mentioned a structural unit derived from acrylic acid, methacrylic acid, 5-norbomene-2,3-dicarboxylic anhydride from the viewpoint of industrial availability, and in particular, it may be a structural unit derived from acrylic acid.

Also, the structural unit derived from the monomer having a carboxyl group and/or a dicarboxylic anhydride group may be one kind, or may be a plural kind.

Incidentally, the dicarboxylic anhydride group may react with moisture in the air to open a ring and partially become a dicarboxylic acid, and as long as in the range that the gist of the present invention is not deviated, the dicarboxylic anhydride group may be ring-opened.

(3) Other Structural Units (C)

As the copolymer (P) according to the present invention, a binary copolymer which consists only of the structural unit (A) and the structural unit (B), and a pluralistic copolymer comprising the structural unit (A), the structural unit (B) and further a structural unit (C) other than these can be used, and it is preferably a pluralistic copolymer which further containing a structural unit (C) other than the structural units represented by the structural unit (A) and the structural unit (B). The monomer which provides the structural unit (C) can be used an optional monomer as long as it is not included in the monomer which provides the structural unit (A) and the structural unit (B). The monomer which provides the structural unit (C) is not limited as long as it is a compound having one or more carbon-carbon double bond in the molecular structure, and may be mentioned, for example, a non-cyclic monomer represented by the general formula (1) and a cyclic monomer represented by the general formula (2), etc.

As compared with the binary copolymer which consists only of the structural unit (A) and the structural unit (B), by using ternary or more of a pluralistic copolymer containing the structural unit (C) component as a base resin of the ionomer, it is possible to obtain a more flexible polymer for lamination than the binary copolymer when it is used for lamination use, and a polymer composition for lamination excellent in heat-sealing properties and hot tack properties can be obtained. The structural unit (C) may be based on one kind of the monomer, or may be used two or more kinds of the monomers in combination.

Non-Cyclic Monomer

[Formula 3]

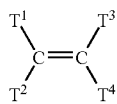

(1)

[in the general formula (1), $T^1$ to $T^3$ each independently represents a substituent selected from the group consisting of a hydrogen atom, a hydrocarbon group having 1 to 20 carbon atoms, a hydrocarbon group having 1 to 20 carbon atoms substituted by a hydroxyl group, a hydrocarbon group having 2 to 20 carbon atoms substituted by an alkoxy group having 1 to 20 carbon atoms, a hydrocarbon group having 3 to 20 carbon atoms substituted by an ester group having 2 to 20 carbon atoms, a hydrocarbon group having 1 to 20 carbon atoms substituted by a halogen atom, an alkoxy group having 1 to 20 carbon atoms, an aryl group having 6 to 20 carbon atoms, an ester group having 2 to 20 carbon atoms, a silyl group having 3 to 20 carbon atoms, a halogen atom and a cyano group, and $T^4$ represents a substituent selected from the group consisting of a hydrocarbon group having 1 to 20 carbon atoms substituted by a hydroxyl group, a hydrocarbon group having 2 to 20 carbon atoms substituted by an alkoxy group having 1 to 20 carbon atoms, a hydrocarbon group having 3 to 20 carbon atoms substituted by an ester group having 2 to 20 carbon atoms, a hydrocarbon group having 1 to 20 carbon atoms substituted by a halogen atom, an alkoxy group having 1 to 20 carbon atoms, an aryl group having 6 to 20 carbon atoms, an ester group having 2 to 20 carbon atoms, a silyl group having 3 to 20 carbon atoms, a halogen atom and a cyano group.]

The carbon skeleton possessed by the hydrocarbon group, the substituted alkoxy group, the substituted ester group, the alkoxy group, the aryl group, the ester group and the silyl group with regard to $T^1$ to $T^4$ may have a branch, ring and/or unsaturated bond.

The carbon number of the hydrocarbon group with regard to T' to $T^4$ may be or more with regard to the lower limit value, and the upper limit value thereof may be 20 or less, and also may be 10 or less.

The carbon number of the substituted alkoxy group with regard to $T^1$ to $T^4$ may be 1 or more with regard to the lower limit value, and the upper limit value thereof may be 20 or less, and also may be 10 or less.

The carbon number of the substituted ester group with regard to $T^1$ to $T^4$ may be 2 or more with regard to the lower limit value, and the upper limit value thereof may be 20 or less, and also may be 10 or less.

The carbon number of the alkoxy group with regard to $T^1$ to $T^4$ may be 1 or more with regard to the lower limit value, and the upper limit value thereof may be 20 or less, and also may be 10 or less.

The carbon number of the aryl group with regard to T' to $T^4$ may be 6 or more with regard to the lower limit value, and the upper limit value thereof may be 20 or less, and also may be 11 or less.

The carbon number of the ester group with regard to $T^1$ to $T^4$ may be 2 or more with regard to the lower limit value, and the upper limit value thereof may be 20 or less, and also may be 10 or less.

The carbon number of the silyl group with regard to T' to $T^4$ may be 3 or more with regard to the lower limit value, and the upper limit value thereof may be 18 or less, and also may be 12 or less. As the group, there may be mentioned a trimethylsilyl group, a triethylsilyl group, a tri-n-propylsilyl group, a triisopropylsilyl group, a dimethylphenylsilyl group, a methyldiphenylsilyl group, and a triphenylsilyl group, etc.

In the ionomer of the present invention, from the viewpoint of easiness in production, $T^1$ and $T^2$ may be hydrogen atoms, $T^3$ may be a hydrogen atom or a methyl group, and $T^1$ to $T^3$ may be all hydrogen atoms.

Also, from the viewpoint of impact resistance, $T^4$ may be an ester group having 2 to 20 carbon atoms.

As the non-cyclic monomer, there may be specifically mentioned the case where $T^4$ which includes (meth)acrylic acid ester, etc., is an ester group having 2 to 20 carbon atoms, and the like.

When $T^4$ is an ester group having 2 to 20 carbon atoms, as the non-cyclic monomer, there may be mentioned a compound represented by the structural formula: $CH_2=C(R^{21})CO_2(R^{22})$, Here, $R^{2'}$ is a hydrogen atom or a hydrocarbon group having a carbon number of 1 to 1.0, which may have a branch, ring and/or unsaturated bond. $R^{22}$ is a hydrocarbon group having 1 to 20 carbon atoms, which may have a branch, ring and/or unsaturated bond. Further, a hetero atom(s) may be contained in an optional position in $R^{22}$.

As the compound represented by the structural formula: $CH_2=C(R^{21})CO_2(R^{22})$, there may be mentioned a compound in which $R^{2'}$ is a hydrogen atom or a hydrocarbon group having a carbon number of 1 to 5. Also, there may be mentioned an acrylic acid ester in which $R^{21}$ is a hydrogen atom or a methacrylic acid ester in which $R^{21}$ is a methyl group.

Specific examples of the compound represented by the structural formula: $CH_2=C(R^{21})CO_2(R^{22})$ may be mentioned, for example, methyl (meth)acrylate, ethyl (meth) acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth) acrylate, dodecyl (meth)acrylate, octadecyl (meth)acrylate, phenyl (meth)acrylate, toluyl (meth)acrylate, benzyl (meth) acrylate, etc.

Specific compounds may be mentioned methyl acrylate, ethyl acrylate, n-butyl acrylate (nBA), isobutyl acrylate (iBA), t-butyl acrylate (tBA) and 2-ethylhexyl acrylate, etc., and in particular, it may be n-butyl acrylate (nBA), isobutyl acrylate (iBA) and t-butyl acrylate (tBA).

Incidentally, the non-cyclic monomer may be one kind, or may be a plural kind,

Cyclic Monomer

[Formula 4]

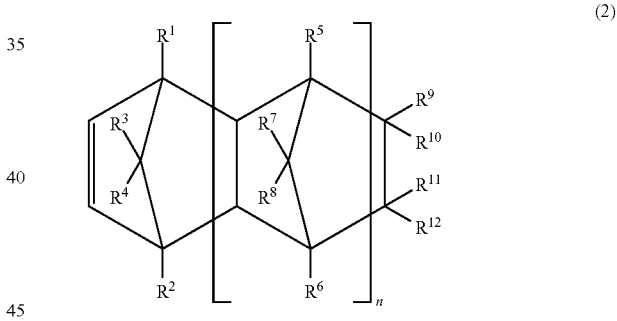

(2)

[in the general formula (2), $R^1$ to $R^{12}$ each may be the same or different from each other, and each is selected from the group consisting of a hydrogen atom, a halogen atom and a hydrocarbon group having 1 to 20 carbon atoms, $R^9$ and $R^{10}$, and $R^{11}$ and $R^{12}$ may be integrated to form a divalent organic group, respectively, and $R^9$ or $R^{10}$, and $R^{11}$ or $R^{12}$ may form a ring with each other.

Also, n indicates 0 or a positive integer, and when ii is 2 or more, $R^5$ to $R^8$ may be the same or different from each other in each repeating unit.]

As the cyclic monomer, there may be mentioned a norbornene-based olefin, etc., and may be mentioned compounds having a skeleton of a cyclic olefin such as norbornene, vinyl norbornene, ethylidene norbornene, norbornadiene, tetracyclododecene, tricyclo[4.3.0.1$^{2,5}$], tricyclo[4.3.0.1$^{2,5}$]deca-3-ene, etc., which may be 2-norbornene (NB) and tetracyclo[6.2.1.1$^{3,6}$0.0$^{2,7}$]dodeca-4-ene, etc.

(4) Copolymer (P)

The copolymer (P) which becomes a base resin of the ionomer used in the present invention contains a structural unit (A) derived from ethylene and/or an α-olefin having 3 to 20 carbon atoms and a structural unit (B) derived from a monomer having a carboxyl group and/or a dicarboxylic anhydride group as essential constitutional units, and further contains an optional structural unit (C) other than the above-mentioned (A) and (B), if necessary, and characterized in that these are substantially linearly copolymerized, and preferably random copolymerized. Here, "substantially linearly" refers to the state that the copolymer does not have branches or frequency of appearing branched structure is low, and the copolymer can be regarded as a linear state. Specifically, it refers to the state in which the phase angled of the copolymer is 50 degrees or more under the conditions mentioned later.

The copolymer according to the present invention is required to contain one or more kinds of the structural unit (A) and one or more kinds of the structural unit (B), 0.25 and to contain two or more kinds of the monomer units in total, and it may contain an optional structural unit (C) other than the above-mentioned (A) and (B), and it is preferably to be a pluralistic copolymer containing such a structural unit (C).

The structural unit and the amounts of the structural units of the copolymer according to the present invention will be explained.

A structure derived from each one molecule of ethylene and/or an α-olefin having 3 to 20 carbon atoms (A), a monomer (B) having a carboxyl group and/or a dicarboxylic anhydride group, and an optional monomer (C) other than (A) and (B) is defined to be one structural unit in the copolymer.

And when the entire structural units in the copolymer is made 100 mol %, a ratio of each structural unit is expressed in mol %, which is an amount of the structural unit.

Amount of structural unit of ethylene and/or α-olefin having 3 to 20 carbon atoms (A):

A lower limit of an amount of the structural unit of the structural unit (A) according to the present invention is selected from 60.0 mol % or more, preferably 70.0 mol % or more, more preferably 80.0 mol % or more, further preferably 85.0 mol % or more, further more preferably 90.0 mol % or more, and particularly preferably 91.2 mol % or more, and an upper limit is selected from 97.9 mol % or less, preferably 97.5 mol % or less, more preferably 97.0 mol % or less, and further preferably 96.5 mol % or less.

If the amount of the structural unit derived from ethylene and/or an α-olefin having 3 to 20 carbon atoms (A) is less than 60.0 mol %, toughness of the copolymer is inferior, while if it is more than 97.9 mol %, crystallinity of the copolymer becomes high and transparency becomes sometimes worse.

Amount of structural unit of monomer having carboxyl group and/or dicarboxylic anhydride group (B):

A lower limit of an amount of the structural unit of the structural unit (B) according to the present invention is selected from 2.0 mol % or more, preferably 2.9 mol % or more, and more preferably 5.2 mol % or more, and an upper limit is selected from 20.0 mol % or less, preferably 15.0 mol % or less, more preferably 10.0 mol % or less, further preferably 8.0 mol % or less, particularly preferably 6.0 mol % or less, and most preferably 5.6 mol % or less.

If the amount of the structural unit derived from the monomer having a carboxyl group and/or a dicarboxylic anhydride group (B) is less than 2.0 mol %, adhesiveness of the copolymer with a different material having high polarity is not sufficient, while if it is more than 20.0 mol %, sufficient mechanical properties of the copolymer cannot be obtained in some cases.

Further, the monomer having a carboxyl group and/or a dicarboxylic anhydride group to be used may be alone, or may be used in combination of two or more kinds.

Amount of Structural Unit of Optional Monomer (C):

When an optional monomer other than the above-mentioned (A) and (B) is contained in the constitutional elements of the ionomer of the present invention, a lower limit of an amount of the structural unit of the structural unit (C) is selected from 0.001 mol % or more, preferably 0.010 mol % or more, more preferably 0.020 mol % or more, further preferably 0.1 mol % or more, further more preferably 1.9 mol % or more, and particularly preferably 2.0 mol % or more, and an upper limit is selected from 20.0 mol % or less, preferably 15.0 mol % or less, more preferably 10.0 mol % or less, further preferably 5.0 mol % or less, and particularly preferably 3.6 mol % or less.

If the amount of the structural unit derived from the optional monomer (C) is 0.001 mol % or more, flexibility of the copolymer becomes easily sufficient, while if it is 20.0 mol % or less, sufficient mechanical properties of the copolymer can be easily obtained.

The optional monomer to be used may be alone, or may be used in combination of two or more kinds.

Number of Branches of Copolymer Per 1,000 Carbons:

In the copolymer of the present invention, from the viewpoints of increasing modulus of elasticity and obtaining sufficient mechanical properties, an upper limit of a number of methyl branches calculated by $^{13}$C-NMR per 1,000 carbons may be 50 or less, may be 5 or less, may be 1 or less, and may be 0.5 or less, and a lower limit is not particularly limited, and it is better when the number is as little as possible. Also, an upper limit of a number of ethyl branches per 1,000 carbons may be 3.0 or less, may be 2.0 or less, may be 1.0 or less, and may be 0.5 or less, and a lower limit is not particularly limited, and it is better when the number is as little as possible. Further, an upper limit of a number of butyl branches per 1,000 carbons may be 7.0 or less, may be 5.0 or less, may be 3.0 or less, and may be 0.5 or less, and a lower limit is not particularly limited, and it is better when the number is as little as possible.

Method for measuring amounts of structural units derived from monomer having carboxyl group and/or dicarboxylic anhydride group, and non-cyclic monomer, and number of branches in copolymer:

Amounts of the structural units derived from the monomer having a carboxyl group and/or a dicarboxylic anhydride group, and the non-cyclic monomer, and a number of branches per 1,000 carbons in the copolymer of the present invention can be obtained by using $^{13}$C-NMR spectrum. $^{13}$C-NMR is measured by the following method.

200 to 300 rug of a sample is charged in an NMR sample tube having an inner diameter of 10 numb with 2.4 ml of a mixed solvent of o-dichlorobenzene ($C_6H_4Cl_2$) and deuterated benzene bromide ($C_6D_5Br$) ($C_6H_4Cl_2/C_6D_5Br=2/1$ (volume ratio)) and hexamethyldisiloxane which is a standard substance of chemical shift, and after replacing with nitrogen, the tube is sealed and the mixture is dissolved under heating to make a uniform solution as an NMR measurement sample.

NMR measurement is carried out using an AV4400M type NMR apparatus manufactured by Brucker Japan Co., Ltd. equipped with a 10 mmφ cryoprobe at 120° C.

$^{13}$C-NMR is measured with a temperature of the sample at 120° C., a pulse angle of 90°, a pulse interval of 51.5 seconds, a number of integrations of 512 times or more and a reverse gate decoupling method.

The chemical shift is set the $^{13}C$ signal of hexamethyldisiloxane to 1.98 ppm, and the chemical shift of the signals by the other $^{13}C$ is based on this.

In the obtained $^{13}C$-NMR, signals specific to the monomer or branches possessed by the copolymer are identified, and by comparing the strength thereof, an amount of the structural unit and a number of branches of each monomer in the copolymer can be analyzed. The positions of the signals specific to the monomer or branches can be referred to known data or can be uniquely identified depending on the sample. Such an analytical method can be generally carried out for those skilled in the art.

Weight Average Molecular Weight (Mw) and Molecular Weight Distribution (Mw/Mn):

A lower limit of the weight average molecular weight (Mw) of the copolymer according to the present invention is generally 1,000 or more, preferably 6,000 or more, and more preferably 10,000 or more, and an upper limit is generally 2,000,000 or less, preferably 1,500,000 or less, further preferably 1,000,000 or less, particularly suitably 800,000 or less, and most preferably 100,000 or less.

If Mw is less than 1,000, physical properties such as mechanical strength and impact resistance, etc., of the copolymer are not sufficient, while if Mw exceeds 2,000,000, melt viscosity of the copolymer becomes extremely high, and molding processing of the copolymer becomes difficult in some cases.

A ratio (Mw/Mn) of the weight average molecular weight (Mw) and the number average molecular weight (Mn) of the copolymer according to the present invention is generally in the range of 1.5 to 4.0, preferably 1.6 to 3.5, and further preferably 1.9 to 2.3. If Mw/Mn is less than 1.5, various kinds of processability including molding of the copolymer are not sufficient, and if it exceeds 4.0, mechanical properties of the copolymer are inferior in some cases.

Also, in the present invention. (Mw/Mn) is sometimes expressed as a molecular weight distribution parameter.

The weight average molecular weight (Mw) and the number average molecular weight (Mn) of the copolymer according to the present invention can be obtained by gel permeation chromatography (GPC). Also, the molecular weight distribution parameter (Mw/Mn) is obtained by, further obtaining the number average molecular weight (Mn) by gel permeation chromatography (GPC), and a ratio of Mw and Mn, Mw/Mn is calculated.

An example of the measurement method of GPC in accordance with the present invention is as follows.

(Measurement Condition)

Used model: 150C manufactured by Waters Corp.
Detector: MIRAN1A•IR detector (measurement wavelength: 3.42 μm) manufactured by FOXBORO
Measurement temperature: 140° C.
Solvent: Ortho-dichlorobenzene (ODCB)
Column: AD806M/S (3 columns) manufactured by SHOWA DENKO K.K.
Flow rate: 1.0 mL/min
Injection amount: 0.2 mL (Preparation of Sample)

The sample was prepared as a solution of 1 mg/mL using ODCB (containing 0.5 mg lint, of BHT (2,6-di-t-butyl-4-methylphenol)), and dissolved at 140"C over about 1 hour.

(Calculation of Molecular Weight (M))

It is carried out by the standard polystyrene method, and conversion from the retention volume to the molecular weight is carried out using a calibration curve previously prepared by the standard polystyrenes. The standard polystyrenes to be used are, for example, a brand of (F380, F288, F128, F80, F40, F20, Ft 0, P4, F1, A5000, A2500, A1000) manufactured by TOSOH CORPORATION, and monodispersed polystyrenes (each 0.07 mg/ml solution of S-7300, S-3900, S-1950, S-1460, S-1010, S-565, S-152, 5-66.0, S-28.5 and S-5.05) manufactured by SHOWA DENKO K.K., etc. A calibration curve is prepared by injecting 0.2 mL of a solution dissolved in ODCB (containing 0.5 mg/mL of BHT) so that each is contained to be 0.5 mg/mL. As the calibration curve, a cubic equation obtained by approximating the least squares method, or logarithmic values of the elution time and the molecular weight are approximated by a quaternary equation, etc., is used. For the viscosity formula $[\eta]=K \times M\alpha$ to be used for conversion to the molecular weight (M), the following numerical values are used.

Polystyrene (PS): $K=1.38 \times 10^{-4}$, $\alpha=0.7$
Polyethylene (PE): $K=3.92 \times 10^{-4}$, $\alpha=0.733$
Polypropylene (PP): $K=1.03 \times 10^{-4}$, $\alpha=0.78$ Melting Point (Tm, ° C.):

The melting point of the copolymer according to the present invention is indicated by the maximum peak temperature of the endothermic curve measured by a differential scanning calorimeter (DSC). The maximum peak temperature indicates the temperature of the peak in which the height from the baseline is the maximum, when multiple peaks are shown in the endothermic curve obtained when the vertical axis is a heat flow (mW) and the horizontal axis is a temperature (° C.) in the DSC measurement, and indicates the temperature of the peak when the peak is one.

The melting point is preferably 50° C. to 140° C., further preferably 60° C. to 138° C., and most preferably 70° C. to 135° C. If it is lower than the range, heat resistance is not sufficient, while if it is higher than the range, adhesiveness is inferior in some cases.

In the present invention, the melting point can be obtained by, for example, using DSC (DSC7020) manufactured by SU. Nanotechnology Co., Ltd., from the absorption curve when about 5.0 mg of the sample is charged in an aluminum pan, elevating the temperature at 10° C./min to 200° C., and after retaining at the same temperature of 200° C. for 5 minutes, lowering the temperature at 1.0° C./min to 20° C., and after retaining at the same temperature of 20° C. for 5 minutes, again, elevating the temperature at 10° C./min to 200° C.

Crystallinity (%):

In the copolymer of the present invention, the crystallinity observed by the differential scanning calorimetry measurement (DSC) is not particularly limited, and preferably exceeding 0% and 30% or less, further preferably exceeding 0% and 25% or less, particularly preferably exceeding 5% and 25% or less, and most preferably 7% or more and 24% or less.

In the present invention, the crystallinity can be obtained by, for example, obtaining the heat of fusion (ΔH) from the area of the heat of fusion endothermic peak obtained by the DSC measurement in the same procedure as in the measurement of the above-mentioned melting point, and the heat of fusion is divided by the heat of fusion 293 Jig of the complete crystal of the high-density polyethylene (HDPE).

Molecular Structure of Copolymer:

The molecular chain terminal of the copolymer according to the present invention may be the structural unit (A) of ethylene and/or an α-olefin having 3 to 20 carbon atoms, may be the structural unit (B) of the monomer having a carboxyl group and/or a dicarboxylic anhydride group, or may be the structural unit (C) of the optional monomer other than (A) and (B).

Also, the copolymer according to the present invention may be mentioned random copolymer, a block copolymer, and a graft copolymer, etc., of the structural unit (A) of ethylene and/or an α-olefin having 3 to 20 carbon atoms, the structural unit (B) of the monomer having a carboxyl group and/or a dicarboxylic anhydride group, and the structural unit (C) of an optional monomer. Among these, it may be a random copolymer capable of containing a large amount of the structural unit (B).

A molecular structure example (1) of a general ternary copolymer is shown in the following.

The random copolymer means a copolymer in which the probability that the structural unit (A) of ethylene and/or an α-olefin having 3 to 20 carbon atoms, the structural unit (B) of the monomer having a carboxyl group and/or a dicarboxylic anhydride group and the structural unit (C) of the optional monomer of the molecular structure example (1) shown below find each structural unit at a position in an arbitrary molecular chain is irrelevant to the kind of the adjacent structural unit.

As shown below, in the molecular structure example (1) of the copolymer, the structural unit (A) of ethylene and/or air α-olefin having 3 to 20 carbon atoms, the structural unit (B) of the monomer having a carboxyl group and/or a dicarboxylic anhydride group and the structural unit (C) of the optional monomer form a random copolymer.

-ABCAAABBCBAABACCAA- [Formula 5]

Molecular Structure Example (1)

Incidentally, when a molecular structure example (2) of the copolymer in which the structural unit (B) of the monomer having a carboxyl group and/or a dicarboxylic anhydride group is introduced by graft modification is also mentioned for reference, a part of the copolymer in which the structural unit (A) of ethylene and/or an α-olefin having 3 to 20 carbon atoms and the structural unit (C) of the optional monomer are copolymerized is graft modified by the structural unit (B) of the monomer having a carboxyl group and/or a dicarboxylic anhydride group.

[Formula 6]

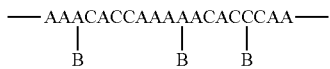

Example (2) of Molecular Structure

Also, it is possible to confirm random copolymerizability of the copolymer by various methods, a method of judging random copolymerizability from the relationship between the comonomer content and the melting point of the copolymer is described in detail in JP 2015-163691A and JP 2016-079408A. From the above-mentioned documents, it can be judged that randomness is low when the inciting point (Tire, °C.) of the copolymer is higher than $-3.74 \times [Z] + 130$ (provided that [Z] is a comonomer content/mol %).

In the copolymer according to the present invention, it is preferred that the melting point (Tm, °C.) observed by the differential scanning calorimetry measurement (DSC) and the total content [Z] (mol %) of the structural unit (B) of the monomer having a carboxyl group and/or a dicarboxylic anhydride group and the st aural unit (C) of the optional monomer satisfy the following formula (I).

$$50 < Tm < -3.74 \times [Z] + 130 \quad (I)$$

When the melting point (Tera, °C.) of the copolymer is higher than. $-3.74 \times [Z] + 130$(°C.), random copolytnerizability is low, so that mechanical properties such as impact strength, etc., are inferior, while when the melting point is lower than 50°C., heat resistance is inferior in some cases.

Further, the copolymer according to the present invention is preferably a material produced in the presence of a transition metal catalyst from the viewpoint of making the molecular structure linear.

Incidentally, it has been known that the molecular structure of a copolymer differs depending on the production method such as polymerization by a high-pressure radical polymerization method process, polymerization using a metal catalyst, etc.

It is possible to control this difference in molecular structure by selecting the production method, and for example, as described in JP 2010-150532A, its molecular structure can be estimated by the complex modulus of elasticity measured by a rotary rheometer.

Phase Angle δ at Absolute Value G*=0.1 MPa of Complex Modulus of Elasticity:

In the copolymer of the present invention, a lower limit of a phase angle δ at the absolute value G*=0.1 MPa of a complex modulus of elasticity measured by a rotary rheometer may be 50 degrees or more, may be 51 degrees or more, may be 54 degrees or more, may be 56 degrees or more, and may be 58 degrees or more, and an upper limit may be 75 degrees or less, and may be 70 degrees or less.

More specifically, when the phase angle δ (G*=0.1. MPa) at an absolute value G*=0.1 MPa of a complex modulus of elasticity measured by a rotary rheometer is 50 degrees or more, the molecular structure of the copolymer shows a linear state structure and a structure that does not contain any long-chain branches, or a substantially linear state structure that contains a small amount of long-chain branches that do not affect the mechanical strength.

Also, when the phase angle δ (G=0.1 MPa) at an absolute value G*=0.1 MPa of a complex modulus of elasticity measured by a rotary rheometer is lower than 50 degree, the molecular structure of the copolymer shows a structure containing long-chain branches excessively, and becomes a material inferior in mechanical strength.

The phase angle δ at an absolute value MPa of a complex modulus of elasticity measured by a rotary rheometer is affected by both of the molecular weight distribution and long-chain branches. However, if it is limited to a copolymer having Mw/Mn≤4, more preferably Mw/Mn≤3, it can be an index of the amount of long-chain branches, and the long-chain branches contained in the molecular structure is larger, the (G*=0.1 MPa) value becomes smaller. Incidentally, if Mw/Mn of the copolymer is 1.5 or more, the δ (G*=0.1 MPa) value never exceed 75 degrees even if the molecular structure is a structure containing no long-chain branches.

A measurement method of complex modulus of elasticity is as follows.

A sample is charged in a mold for heat press with a thickness of 1.0 mm, preheated in a hot press machine at a surface temperature of 180"C for 5 minutes, a residual gas in a molten resin is degassed by repeating pressurization and depressurization, and the sample is further pressurized at 4.9 MPa and maintained for 5 minutes. Thereafter, the sample is transferred to a press machine with a surface temperature of 25°C.; to cool it at a pressure of 4.9 MPa for 3 minutes, whereby a press plate comprising the sample having a thickness of about 1.0 mm is prepared. The press plate comprising the sample is processed into a circle with a diameter of 25 mm, which is made a sample, and dynamic viscoelasticity thereof is measured using an ARES type rotary rheometer manufactured by Rheometrics as a measurement device of dynamic viscoelasticity characteristics under nitrogen atmosphere and the following conditions.

Plate: φ25 mm parallel plate
Temperature: 160° C.
Strain amount: 10%
Measurement angular frequency range: $1.0 \times 10^{-2}$ to $1.0 \times 10^2$ rad/s
Measurement interval: 5 point decade A phase angle δ is plotted to the common logarithm log G* of the absolute value G* (Pa) of a complex modulus of elasticity, and the value of δ (degree) at the point corresponding to log G*=, 0.5.0 is made δ (G*=0.1 MPa). When there is no point corresponding to log G*=5.0 in the measurement points, the δ value at log G*=5.0 is obtained by linear interpolation using two points around log G*=5.0. Also, when all the measurement points are log G*=5, the 8 value at log G*=5.0 is obtained by extrapolating the 5 value at low. G*=5.0 using the three points from the largest log G* value with the quadratic curve.

With Regard to Production of Copolymer

The copolymer according to the present invention is preferably a material produced in the presence of a transition metal catalyst from the viewpoint of making the molecular structure linear state.

Polymerization Catalyst

A kind of the polymerization catalyst used for production of the copolymer according to the present invention is not particularly limited as long as it is capable of copolymerizing the structural unit (A), the structural unit (B) and the optional structural unit (C) and, for example, there may be mentioned transition metal compounds of Group 5 to Group 11 having a chelating ligand.

Specific examples of preferable transition metals may be mentioned vanadium atom, niobium atom, tantalum atom, chromium atom, molybdenum atom, tungsten atom, manganese atom, iron atom, platinum atom, ruthenium atom, cobalt atom, rhodium atom, nickel atom, palladium atom, copper atom, etc. Among these, it is preferably transition metals of Group 8 to Group 11, further preferably transition metals of Group 10, and particularly preferably nickel (Ni) and palladium (Pd). These metals may be single or may be used in combination of a plural kinds.

The chelating ligand has at least two atoms selected from the group consisting of P, N, O, and S, includes a ligand which is bidentate or multidentate, and is electrically neutral or anionic. In a review by Brookhart et al., structure of the chelating ligands is exemplified (Chem. Rev., 2000,100, 1169).

As the chelating ligand, there may be preferably mentioned a bidentate anionic P and O ligands. As the bidentate anionic P and O ligands, there may be mentioned, for example, phosphorus sulfonic acid, phosphorus carboxylic acid, phosphorus phenol and phosphorus enolate. As the chelating ligands, as others, there may be mentioned bidentate anionic N and O ligands. As the bidentate anionic N and O ligands, there may be mentioned, for example, salicylamide iminate and pyridine carboxylic acid. As the chelating ligand, as others, there may be mentioned diimine ligand, diphenoxide ligand and diamide ligand, etc.

The structure of the metal complex obtained from the chelating ligand is represented by the following structural formula (a) or (b) in which an arylphosphine compound, an arylarsine compound or an arylantimony compound each may have a substituents) is coordinated.

[Formula 7]

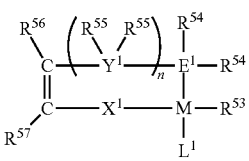

Structural formula (a)

[Formula 8]

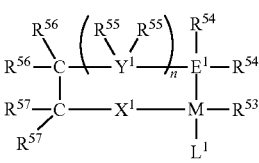

Structural formula (b)

[in the structural formula (a) and the structural formula (b),

M represents a transition metal belonging to any of Group 5 to Group 11 of the periodic table, i.e., various transition metals as mentioned above.

$X^1$ represents oxygen, sulfur, —$SO_3$— or —$CO_2$—.

$Y^1$ represents carbon or silicon.

n represents an integer of 0 or 1.

$E^1$ represents phosphorus, arsenic or antimony.

$R^{53}$ and $R^{54}$ each independently represents hydrogen or a hydrocarbon group having 1 to 30 carbon atoms which may contain a hetero atom(s).

$R^{55}$s each independently represents hydrogen, halogen or a hydrocarbon group having 1 to 30 carbon atoms which may contain a hetero atom(s).

$R^{56}$ and $R^{57}$ each independently represents hydrogen, halogen or a hydrocarbon group having 1 to 30 carbon atoms which may contain a hetero atom(s), $OR^{52}$, $CO_2R^{52}$, $CO_2M'$, $C(O)N(R^{51})_2$, $C(O)R^{52}$, $SO_2R^{52}$, $SOR^{52}$, $OSO_2R^{52}$, $P(O)(OR^{52})_{2-y}(R^{51})_y$, CN, $NHR^{52}$, $N(R^{52})_2$, $Si(OR^{51})_{3-x}(R^{51})_x$, $OSi(OR^{51})_{3-x}(R^{51})_x$, $NO_2$, $SO_3M'$, $PO_3M'_2$; $P(O)(OR^{52})_2M'$ or an epoxy-containing group.

$R^{51}$ represents hydrogen or a hydrocarbon group having 1 to 20 carbon atoms.

$R^{52}$ represents a hydrocarbon group having 1 to 20 carbon atoms.

M' represents an alkali metal, an alkaline earth metal, ammonium, quaternary ammonium or phosphonium, x represents an integer of 0 to 3 and y represents an integer of 0 to 2.

Incidentally, $R^{56}$ and $R^{57}$ may be bonded to each other to form an alicyclic ring, an aromatic ring or a heterocyclic ring containing a hetero atom(s) selected from oxygen, nitrogen or sulfur. At this time, a number of the ring member is 5 to 8, and the ring may have or may not have a substituent(s).

$L^1$ represents a ligand coordinated to M.

Also, $R^{53}$ and $L^1$ may be bonded to each other to form a ring.]

It is more preferably a transition metal complex represented by the following structural formula. (c),

[Formula 9]

Structural formula (c)

[in the structural formula (c),
M represents a transition metal belonging to any of Group 5 to Group 11 of the periodic table, i.e., various transition metals as mentioned above.
$X^1$ represents oxygen, sulfur, —$SO_3$— or —$CO_2$—.
$Y^1$ represents carbon or silicon.
n represents an integer of 0 or 1.
$E^1$ represents phosphorus, arsenic or antimony.
$R^{53}$ and $R^{54}$ each independently represents hydrogen or a hydrocarbon group having 1 to 30 carbon atoms which may contain a hetero atom(s).
$R^{55}$s each independently represents hydrogen, halogen or a hydrocarbon group having 1 to 30 carbon atoms which may contain a hetero atom(s).
$R^{58}$, $R^{59}$, $R^{6'}$ and $R^{6'}$ each independently represents hydrogen, halogen or a hydrocarbon group having 1 to 30 carbon atoms which may contain a hetero atom(s), $OR^{52}$, $CO_2R^{52}$, $CO_2M'$, $C(O)N(R^{51})_2$, $C(O)R^{52}$, $SR^{52}$, $SO_2R^{52}$, $SOR^{52}$, $OSO_2R^{52}$, $P(O)(OR^{52})_{2-y}(R^{51})_y$, CN, $NHR^{52}$, $N(R^{52})_2$, $Si(OR^{51})_{3-x}(R^{51})_x$, $OSi(OR^{51})_{3-x}$ $(R^5\%$, $NO_2$, $SO_3M'$, $PO_3M'2$, $P(O)(OR^{52})_2M'$ or an epoxy-containing group.
$R^{51}$ represents hydrogen or a hydrocarbon group having 1 to 20 carbon atoms.
$R^{52}$ represents a hydrocarbon group having 1 to 20 carbon atoms.
M' represents an alkali metal, an alkaline earth metal, ammonium, quaternary ammonium or phosphonium, x represents an integer of 0 to 3 and y represents an integer of 0 to 2.
Incidentally, a plural number of the groups optionally selected from $R^{58}$ to $R^{6'}$ may be bonded to each other to form an alicyclic ring, an aromatic ring or a heterocyclic ring containing a hetero atom(s) selected from oxygen, nitrogen or sulfur. At this time, a number of the ring member is 5 to 8, and the ring may have or may not have a substituent(s).
$L^1$ represents a ligand coordinated to M.
Also, $R^{53}$ and $L^1$ may be bonded to each other to form a ring.]

Here, as a catalyst of the transition metal compound of Group 5 to Group 11 having a chelating ligand, catalyst such as the so-called SHOP-based catalyst and Drent-based catalyst, etc., have been representatively known.

The SHOP-based catalyst is a catalyst in which a phosphorus-based ligand having an aryl group which may have a substituent(s) is coordinated to a nickel metal (for example, see WO2010-050256).

Also, the Drent-based catalyst is a catalyst in which a phosphorus-based ligand having an aryl group which may have a substituent(s) is coordinated to a palladium metal (for example, see JP 2010-202647A).

Polymerization Method of Copolymer:

The polymerization method of the copolymer according to the present invention is not limited.

As the polymerization method, there may be mentioned slurry polymerization in which at least a part of the formed polymer becomes a slurry in a medium, bulk polymerization using the liquefied monomer itself as a medium, vapor phase polymerization carried out in a vaporized monomer or high pressure ion polymerization in which at least a part of the formed polymer is dissolved in the monomer liquefied at high temperature and high pressure, etc.

As the polymerization format, it may be any format of batch polymerization, semi-batch polymerization or continuous polymerization.

Also, living polymerization may be carried out, or polymerization may be carried out while simultaneously causing chain transfer.

Further, at the time of the polymerization, it may be carried out by using the so-called chain shuttling agent (CSA) in combination, chain shuttling reaction or coordinative chain transfer polymerization (CCTP) may be carried.

With regard to the specific producing process and conditions, for example, these are disclosed in JP 2010-260913A and JP 2010-202647A.

Introducing Method of Carboxyl Group and/or Dicarboxylic Anhydride Group into Copolymer:

Introducing method of the carboxyl group and/or the dicarboxylic anhydride group into the copolymer according to the present invention is not particularly limited.

A carboxyl group and/or a dicarboxylic anhydride group can be introduced by various methods in the range as long as the gist of the present invention is not deviated.

The method for introducing the carboxyl group and/or the dicarboxylic anhydride group may be mentioned, for example, a method in which a comonomer having a carboxyl group and/or a dicarboxylic anhydride group is directly, copolymerized, a method in which after the other monomer(s) is/are copolymerized, a carboxyl group and/or a dicarboxylic anhydride group is introduced by modification, etc.

As a method for introducing a carboxyl group and/or a, dicarboxylic anhydride group by modification, there may be mentioned, for example, when a carboxylic acid is to be introduced, a method in which after copolymerizing an acrylic acid ester, the product is hydrolyzed to change to a carboxylic acid, a method in which after copolymerizing a t-butyl acrylate, the product is decomposed under heating to change to a carboxylic acid, etc.

When the above-mentioned hydrolysis or decomposition under heating is carried out, a conventionally known acidic or basic catalyst may be used as an additive for promoting the reaction. As the acidic or basic catalyst, it is not particularly limited, and may be optionally used, for example, a hydroxide of an alkali metal or an alkaline earth metal such as sodium hydroxide, potassium hydroxide, lithium hydroxide, etc., a carbonate of an alkali metal or an alkaline earth metal such as sodium hydrogen carbonate, sodium carbonate, etc., solid acid such as montmorillonite, etc., an inorganic acid such as hydrochloric acid, nitric acid, sulfuric acid, etc., an organic acid such as formic acid, acetic acid, benzoic acid, citric acid, para-toluenesulfonic acid, trifluoroacetic acid, trifluoromethanesulfonic acid, etc.

From the viewpoints of reaction promoting effect, price, equipment corrosive property, etc., sodium hydroxide, potassium hydroxide, sodium carbonate, trifluoroacetic acid and para-toluenesulfonic acid are preferable, and trifluoroacetic acid and para-toluenesulfonic acid are more preferable.

(5) Ionomer

The ionomer according to the present invention is an ionomer in which at least a part of the carboxyl group and/or the dicarboxylic anhydride group of the structural unit (B) of the copolymer of the present invention is converted to a metal-containing carboxylic acid salt containing at least one kind of a metal ion selected from Group 1, Group 2 or Group 12 of the periodic table, which has substantially linear structure. Incidentally, the ionomer can be obtained by allowing a metal salt to act on the ionomer base resin as mentioned later, and at that time, a reaction that cleaves the molecular chain of the polymer does not generally occur, Therefore, the parameters regarding the structure such as a molar ratio of the comonomers, degree of branches, randomness, etc., are generally preserved between the ionomer base resin and the ionomer.

Stricture of Ionomer

The ionomer according to the present invention has substantially linear structure similarly to the copolymer according to the present invention, so that it is characterized in that a phase angle δ at an absolute value $G^*=0.1$ MPa of a complex modulus of elasticity measured by a rotary rheometer is 50 to 75 degrees. The lower limit of the phase angle δ may be 51 degrees or more, and the upper limit of the phase angle δ may be 64 degrees or less.

If the phase angle δ ($G^*=0.1$ MPa) is lower than 50 degrees, the molecular structure of the ionomer shows a structure containing long-chain branches excessively, and becomes a material inferior in mechanical strength. As mentioned above, if Mw/Mn≤4, the value of the phase angle δ becomes an index of an amount of the long-chain branches. If Mw/Mn of the ionomer is 1.5 or more, there is no case where δ ($G^*=0.1$ MPa) value exceeds 75 degrees even in the case where the molecular structure is a structure where it does not contain the long-chain branches.

Melting Point (Tm, ° C.) of Ionomer

The melting point (Tm, ° C.) of the ionomer according to the present invention is preferably 50° C. to 140° C., further preferably 60° C. to 138° C., and most preferably 70° C. to 135° C. if it is lower than this range, heat resistance is not sufficient, while if it is higher than the range, there is a case where adhesiveness in inferior.

Among the ionomers in accordance with the invention of the present application, the ionomer which becomes a binary copolymer consists only of the structural unit (A) and the structural unit (B) as a base, the melting point shows 90° C. or higher, preferably 95° C. or higher, and further preferably 100° C. or higher, and the melting point of the ionomer which comprises a multinary copolymer of ternary or more as a base shows lower than 100° C., preferably lower than 95° C., and further preferably lower than 90° C.

Crystallinity (%):

In the ionomer of the present invention, the crystallinity measured by the differential scanning calorimetry measurement (DSC) is not particularly limited, and is preferably exceeding 0% and 30% or less, further preferably exceeding 0©% and 25% or less, particularly preferably exceeding 5% and 25% or less, and most preferably 7% or more and 24% or less.

If the crystallinity is 0%, toughness of the ionomer is not sufficient, while if the crystallinity is higher than 30%, transparency of the copolymer is inferior in some cases. Incidentally, the crystallinity is an index of transparency, and it can be judged that the lower the crystallinity of the ionomer, the better the transparency.

Metal Ion

The metal ion contained in the ionomer according to the present invention is not particularly limited, and a metal ion used in the conventionally known ionomer can be contained. As the metal ion, among these, a metal ion of Group 1, Group 2 or Group 12 of the periodic table is preferable, and at least one kind selected from the group consisting of $Li^+$, $Na^+$, $K^+$, $Rb^+$, $Mg^{2+}$, $Si^{2+}$, $Ba^{2+}$ and $Zn^{2+}$ is more preferable. It can be mentioned particularly preferably at least one kind selected from the group consisting of $Li^+$, $Na^+$, $K^+$, $Mg^+$, $Ca^{2+}$ and $Zn^{2+}$, and further preferably $Na^+$, and $Zn^{2+}$.

These metal ions can be contained two or more kinds in admixture, if necessary.

Degree of Neutralization (Mol %)

A content of the metal ion is preferably to contain an amount that neutralize at least a part or whole of the carboxyl group and/or the dicarboxylic anhydride group in the copolymer as the base polymer, and preferable degree of neutralization (average degree of neutralization) is 5 to 95 mol %, more preferably 10 to 90 mol %, and further preferably 20 to 80 mol %.

When the degree of neutralization is high, tensile strength and tensile fracture stress of the ionomer are high, and tensile fracture strain is small, but melt flow rate (MFR) of the ionomer tends to be low. On the other hand, when the degree of neutralization is low, an ionomer having a suitable MFR can be obtained, but tensile elasticity and tensile fracture stress are low, and tensile fracture strain tends to be high.

Incidentally, the degree of neutralization can be obtained from a ratio of a total molar amount of the valence of the metal ion×molar amount, to the total molar amount of the carboxy group containable in the carboxy group and/or the dicarboxylic anhydride group in the copolymer.

The dicarboxylic anhydride group becomes a dicarboxylic acid by ring-opening at the time of forming a carboxylic acid salt, so that the total molar amount of the carboxy group is obtained assuming that 1 mol of the dicarboxylic anhydride group has 2 mol of the carboxy group. Also, for example, with regard to the divalent metal ion such as $Zn^{2+}$, etc., the total molar amount of the molecule of the degree of neutralization is calculated by 2× molar amount assuming that a salt can be formed with 2 mol of the carboxy group per 1 mol thereof.

Production Method of Ionomer

The ionomer according to the present invention may be obtained treating the copolymer of ethylene and/or an α-olefin having 3 to 20 carbon atoms/unsaturated carboxylic acid obtained by the introducing method of the carboxyl group and/or the dicarboxylic anhydride group into the copolymer as mentioned above with a metal salt containing at least one kind of a metal ion selected from. Group 1, Group 2 or Group 1 of the periodic table, and subjecting to a conversion step in which it is converted into a metal-containing carboxylic acid salt. Also, the ionomer according to the present invention may be obtained by heating the ethylene and/or an α-olefin having 3 to 20 carbon atoms/ unsaturated carboxylic ester copolymer and subjecting to a heat conversion step in which at least a part of the ester group in the copolymer is converted to a metal-containing carboxylic acid salt containing at least one kind of a metal ion selected from Group 1, Group 2 or Group 1.2 of the periodic table.

When an ionomer is produced after introducing a carboxyl group and; or a dicarboxylic anhydride group into a polymer, the producing method is, for example, as follows. That is, it can be obtained by, according to circumstance, heating and kneading a substance which captures a metal ion such as an ethylene/methacrylic acid (MAA) copolymer, etc., with a metal salt to prepare a metal ion supply source, and then, adding the metal ion supply source to an ionomer base resin with an amount that gives a desired degree of neutralization, and kneading.

Also, in the heat conversion step, (i) the carboxylic acid in an ethylene and/or an α-olefin having 3 to 20 carbon atoms/unsaturated carboxylic acid copolymer may be converted into a metal-containing carboxylic acid salt by heating an ethylene and/or an α-olefin having 3 to 20 carbon attires/unsaturated carboxylic ester copolymer, and hydrolyzing or thermally decomposing the same to make an ethylene and/or an α-olefin having 3 to 20 carbon atoms/unsaturated carboxylic acid copolymer, and then, reacting with a compound containing a metal ion of Group 1, Group 2 or Group 12 of the periodic table, and (ii) the ester group portion in the ethylene and/or an α-olefin having 3 to 20 carbon atoms/unsaturated carboxylic ester copolymer may be converted into the metal-containing carboxylic acid salt by hating an ethylene and/or an α-olefin having 3 to 20 carbon atoms/unsaturated carboxylic ester copolymer while hydrolyzing or thermally decomposing the ester group of the copolymer, and reacting with a compound containing a metal ion of Group 1, Group 0.2 or Group 12 of the periodic table.

Further, the compound containing a metal ion may be an oxide, a hydroxide, a carbonate, a bicarbonate, an acetate, a formate, etc., of a metal of Group 1, Group 2 or Group 12 of the periodic table.

The compound containing a metal ion may be supplied to a reaction system in the form of granules or fine powder, may be supplied to a reaction system after dissolving or dispersing in water or an organic solvent, or may be supplied to a reaction system by preparing a master batch using an ethylene/unsaturated carboxylic acid copolymer or olefin copolymer as a base polymer. In order to proceed the reaction smoothly, a method of preparing a masterbatch and supplying it to a reaction system is preferable.

Furthermore, the reaction with a compound containing a metal ion may be carried out melting and kneading with various types of apparatus such as a vent extruder, a Banbury mixer and a roll mill, and the reaction may be a batch system or a continuous method. Since the reaction can be smoothly carried out by discharging the by-Producing water and carbon dioxide gas produced by the reaction by the deaerator, it is preferable to continuously carry out the reaction using an extruder equipped with a degassing apparatus such as a bent extruder.

When reacting with the compound containing a metal ion, a small amount of water may be injected to promote the reaction.

The temperature for heating the ethylene and/or an α-olefin having 3 to 20 carbon atoms/unsaturated carboxylic ester copolymer may be a temperature at which the ester becomes a carboxylic acid, and if the heating temperature is too low, the ester is not converted into a carboxylic acid, while if it is too high, decarbonylation and decomposition of the copolymer may proceed in some cases. Accordingly, heating temperature of the present invention is carried out preferably in the range of 80° C. to 350° C., more preferably 100° C. to 340° C., further preferably 150° C. to 330° C., and further more preferably 200° C. to 320° C.

A reaction time may vary depending on the heating temperature and reactivity at the ester group portion, etc., and generally 1 minute to 50 hours, more preferably 2 minutes to 30 hours, further preferably 2 minutes to 10 hours, more further preferably 2 minutes to 3 hours, and particularly preferably 3 minutes to 2 hours.

In the above-mentioned step, the reaction atmosphere is not particularly limited, and it is generally preferable to carry out the step under an inert gas stream. As examples of the inert gas, nitrogen, argon and carbon dioxide atmosphere can be used, A small amount of oxygen or air may be mixed therein.

The reactor used in the above-mentioned step is not particularly limited, and it is not limited as long as it is a method capable of stirring the copolymer substantially uniformly, a glass container equipped with a stirrer or an autoclave (AC) may be used, and any conventionally known kneader such as Brabender Plastograph, a single-screw or twin-screw extruder, a high-power screw kneader, a Banbury mixer, a kneader, a roll, etc., can be used.

Whether or not a metal ion is introduced into an ionomer base resin and becomes an ionomer can be confirmed by examining decrease in the peak derived from a carbonyl group of the carboxylic acid (dimer) by measuring an IR spectrum of the obtained resin. Similarly, the degree of neutralization can be confirmed, in addition to the calculation from the above-mentioned molar ratio, by examining decrease in the peak derived from a carbonyl group of the carboxylic acid (dimer), and increase in the peak derived from a carbonyl group of the carboxylic acid base.

<Ionomer Physical Property>

As the ionomer to be used in the present invention, in particular, as the ionomer for lamination suitable tier lamination use, those having any of the following physical properties or a combination thereof under the measurement conditions described in the column of Examples mentioned later.

MFR:

In the ionomer of the present invention, a melt flow rate (MFR) at a temperature of 190° C. and a load of 2.16 kg is 0.01 to 30 g/10 miii, preferably 0.1 to 15 g/10 min, and more preferably 0.5 to 20 g/10 min.

If MFR of the ionomer is within the range, laminate molding is easy.

Tensile Elasticity:

In the ionomer of the present invention, tensile elasticity is 20 MPa preferably 20 to 350 MPa, and preferably 20 to 300 MPa.

If the tensile elasticity of the ionomer is within this range, when the laminated body is formed, adhesiveness becomes good. Also, the ionomer can be produced without becoming design in terms of elasticity difficult.

Tensile Impact Strength:

In the ionomer of the present invention, tensile impact strength is 100 $KJ/m^2$ or more, preferably tensile impact strength is 700 $KJ/m^2$ or more, and further preferably 800 $KJ/m^2$ or more.

In the ionomer using a muitinary copolymer of ternary-based or more as a base, an ionomer which accomplishes, in particular, tensile impact strength of 700 $KJ/m^2$ or more can be obtained. If tensile impact strength of the ionomer is within this range, even if there is rubbing, etc., a fear of damage is reduced. The upper limit of the tensile impact strength is not particularly limited within the range obtained from a material used for those skilled in the art.

Resin Composition

The (X1) ionomer in the present invention can be subjected to extrusion laminate molding by itself alone by cross-linking, and for the purpose of further improving processability at the time of extrusion laminate molding processing, an ethylene-based copolymer using ethylene as an essential monomer by (X2) high-pressure radical polymerization may be added to prepare a polymer composition. In the "polymer composition" herein mentioned, a material in which a weight ratio of the (X1) ionomer is 100% by weight, that is, a material comprising only of the (X1) ionomer alone is also contained.

A weight ratio of the (X1) ionomer in the polymer composition according to the present invention is 100 to 60% by weight. By making the weight ratio 60% by weight or more, physical properties such as high hot tack strength, etc., can be more easily obtained.

The ethylene-based copolymer containing ethylene by high-pressure radical polymerization as an essential monomer (X2) is a low-density polyethylene (hereinafter referred to as LDPE) obtained by a high-pressure radical polymerization process, or an ethylene-based copolymer comprising ethylene and a radically polymerizable monomer other than the ethylene. When (X2) contains a radically polymerizable monomer other than the ethylene by high-pressure radical polymerization, an amount of the structural unit of the ethylene in (X2) is preferably 75 mol % or more based on the whole (X2), and more preferably 80 mol % or more. By making it within this range, melt tension of the polymer composition is in an appropriate range and extrusion laminate molding, etc., can be easily carried out.

As the radically polymerizable monomer other than the ethylene, there may be mentioned vinyl esters such as vinyl propionate, vinyl acetate, vinyl caproate, vinyl caprylate, vinyl laurylate, vinyl stearate, vinyl trifluoroacetate, etc., or an α,β-unsaturated carboxylic acid such as acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, etc., or an ester derivative thereof. Among these; (meth)acrylic acid and its alkyl ester such as methyl ester, ethyl ester, etc., can be mentioned as particularly preferable materials.

MFR of the low-density polyethylene (LDPE) obtained by the high-pressure radical polymerization process is selected in the range of 0.05 to 50 g/10 min, and preferably 0.1 to 30 g/min. If it is within this range, melt tension of the polymer composition is in an appropriate range and extrusion laminate molding, etc., are easy.

The density of the LDPE is selected in the range of 0.91 to 0.94 g/cm$^3$, preferably 0.912 to 0.935 g/cm$^3$, and further preferably 0.912 to 0.930 g/cm$^3$. Also, molecular weight distribution (Mw/Mn) is 3.0 to 12, and preferably 4.0 to 12.0.

A content of the (meth)acrylic acid and (meth)acrylic acid ester in the ethylene-based copolymer obtained by the high-pressure radical polymerization process is in the range of 3 to 20% by weight, and preferably 5 to 15% by weight. The MFR of these copolymers is selected in the range of 0.1 to 30 g/10 min, and preferably 0.2 to 20 g/10 min. If the MFR is within this range, melt tension of the composition is in an appropriate range and extrusion laminate molding, etc., are easy.

As a producing method of these LDPE and ethylene-based copolymer, they are produced by the known high-pressure radical polymerization method, and may be either of a tubular method or an autoclave method.

A weight ratio of the ethylene-based copolymer containing ethylene as an essential monomer by (X2) high-pressure radical polymerization in the present invention is 0 to 40% by weight in the polymer composition. By making it 40% by weight or less, physical properties such as high hot tack strength, etc., by the ionomer ref the component (X1) can be easily obtained, while improving processability at the time of molding processing.

The melt flow rate (MFR) of the polymer composition of the present invention is in the range of 1.0 to 100 g/10 mire, preferably in the range of 2.0 to 50 g/10 min, and more preferably in the range of 2.0 to 20 g/10 min. By making the MFR in the above-mentioned range, good molding processability can be obtained including extrusion load can be made low and ductility becomes good, etc., and in addition, neck-in does not become large and stability of the film at the film formation is improved.

As a formulation of the polymer composition of the present invention, they can be formulated by the known method generally used as the conventional formulation method of the resin composition. As an example thereof, it can be carried out by simply dry-blending the component (X1), the component (X2) and other additives capable of adding, etc. Also, as the other example, the component (X1), the component (X2) and optionally various kinds of additives are dry-blended using a mixing machine such as a tumbler, a ribbon blender or a Henschel mixer, etc., and then, melt-mixing by a known continuous type melt-kneader such as a single-screw extruder, a twin-screw extruder, etc., and extruded to prepare pellets whereby the polymer composition can be obtained.

To the polymer composition of the present invention, known additives such as antifogging agents, organic or inorganic fillers, antioxidants, organic or inorganic-based pigments, IN inhibitors, saturated or unsaturated fatty acid amides, lubricants such as metal salt of a saturated or unsaturated higher fatty acid, etc., dispersant, nucleating agents, cross-linking agents, etc., may be added within the range which does not substantially impair the characteristics of the invention of the present application.

<Laminated Body>

The laminated body of the present invention comprises a laminated body containing at least Layer 1 which is a base material layer and Layer II which is a sealant layer. If necessary, a polyolefin layer such as polyethylene, etc., which is called polylami or a layer such as an acid-modified polyolefin layer in which an unsaturated carboxylic acid or its derivative is graft-modified to various kinds of polyolefins and/or rubbers may be provided between the base material layer and the sealant layer, and further on the outside of the base material layer. Also, the base material may be subjected to a vapor deposition treatment, polyvinylidene chloride coating, etc.

As the base material layer which is Layer I in the laminated body of the present invention, there may be mentioned paper such as high-quality paper, Kraft paper, thin paper, Kent paper, etc., metal foil such as aluminum foil, etc., cellophane, woven fabric, non-woven fabric, Nylon-based base materials such as stretched Nylon, non-stretched Nylon, special Nylon (MXD6, etc.), K-Nylon (polyvinylidene fluoride-coated), etc., PET (polyethylene terephthalate)-based base materials such as stretched PET, non-stretched PET, K-PET, aluminum vapor deposited PET (VMPET), etc., polypropylene-based base materials such as stretched PP (OPP) non-stretched PP (CPP), aluminum vapor deposited PP, K-PP, co-extruded film PP, etc., synthetic resin film-based base materials such as LDPE film, LLDPE, EVA film, stretched LDPE film, stretched HDPE film, polystyrene-based film, etc. Also, the base material layer which is Layer I may be a composite base material in which a plurality of base materials exemplified above are previously pasted by the known dry laminate molding or extrusion laminate molding. Examples of these composite base materials may be exemplified by stretched Nylon/stretched PET, stretched PET/aluminum foil/stretched PET, stretched PET/LDPE/aluminum foil, stretched PET/LDPE/aluminum foil/LDPE, a saponified product of stretched PET/ethylene-vinyl acetate copolymer, a saponified product of stretched polypropylene/ethylene-vinyl acetate copolymer, etc. Also, these may be a printed material.

For the sealant layer which is Layer II in the laminated body of the present invention, a polymer composition for lamination of the present invention is used. Within the range which does not impair the effect of the present invention, an optional conventionally known resin material(s) used in the conventional polymer resin composition for lamination may be formulated in the sealant layer in addition to the polymer composition of the present invention. For example, there may be mentioned high-density polyethylene, medium-density polyethylene, low-density polyethylene, ethylene-vinyl acetate copolymer, ethylene-acrylic acid ester copolymer, other ionomers, etc. A formulation amount can be optionally selected from the content of the resin composition of 1 to 50% by weight, and preferably 5 to 20% by weight.

The resin composition can be also used by combining two or more kinds of the materials. The sealant layer is preferably a layer composed only of the polymer composition of the present invention.

As a method for producing the laminated body of the present invention, it may be carried out by various known methods including a method in which the sealant layer which is Layer II is previously processed into a film form by film molding, and the base material of Layer I and Layer II which is made a film are pasted by dry laminate molding to laminate them, or a method in which Layer II which is made a film is used as a sand base material and laminated to the base material of Layer I by extrusion laminate molding subjecting to sand lamination using a resin capable of subjecting to extrusion laminate processing such as LOPE and an ethylene-based copolymer, etc., or, a method in which, to the base material of Layer I, a polymer composition for lamination is extruded by the extrusion laminate molding as Layer II and laminated. When the sealant layer of the laminated body of the present invention is subjected to laminate molding by directly extruding with extrusion laminate molding, which is not particularly limited, in particular, in the polymer composition for lamination of the present invention, it is preferable to carry out molding at a molding resin temperature of 250 to 290° C. and a cooling roll temperature of 10 to 25° C.

The laminated body of the present invention has a sealant layer particularly excellent in hot tack properties due to a substantially linear state ionomer. Therefore, it can be suitably used as a packaging material in a bag shape.

EXAMPLES

Hereinafter, the present invention will be explained in more detail by referring to Examples and Comparative Example, but the present invention is not limited to these Examples. Incidentally, measurement and evaluation of physical properties in Examples and Comparative Example are carried out by the methods shown below. Also, no data in the table means not measured, and not detected means less than detection limit.

<Measurement and Evaluation>

(I) Measurement of Phase Angle δ at Absolute Value G*=0.1 MPa of Complex Modulus of Elasticity 1) Preparation of Sample and Measurement A sample was charged in a mold for heat press with a thickness of 1.0 mm, preheated in a hot press machine at a surface temperature of 180° C. for 5 minutes, a residual gas in a molten resin was degassed by repeating pressurization and depressurization, and the sample was further pressurized at 4.9 MPa and maintained for 5 minutes, Thereafter, it was transferred to a press machine with a surface temperature of 25° C. to cool it at a pressure of 4.9 MPa for 3 minutes, whereby a press plate comprising the sample having a thickness of about 1.0 mm was prepared. The press plate comprising the sample was processed into a circle with a diameter of 25 mm, which was made a sample, and dynamic viscoelasticity thereof was measured using an ARES type rotary rheometer manufactured by Rheometrics as a measurement device of dynamic viscoelasticity characteristics under nitrogen atmosphere and the following conditions.

Plate: φ25 rum (diameter) parallel plate
Temperature: 160° C.
Strain amount: 10%
Measurement angular frequency range: $1.0 \times 10^{-2}$ to $1.0 \times 10^2$ rad/s
Measurement interval: 5 points/decade A phase angle δ was plotted to the common logarithm log G* of the absolute value G* (Pa) of a complex modulus of elasticity, and the value of δ (degree) at the point corresponding to log G*=5.0 was made δ (G*=0.1 MPa). When there was no point corresponding to log G*=5.0 in the measurement points, the δ value at log G*=5.0 was obtained by linear interpolation using two points around log G*=5.0, Also, when all the measurement points were log G*=5, the δ value at log G*=5.0 was obtained by extrapolating the δ value at log G*=5.0 using the three points from the largest log (0.3-' value with the quadratic curve.

(2) Measurement of Weight Average Molecular Weight (Mw) and Molecular Weight Distribution Parameter (Mw/Mn)

The weight average molecular weight (Mw) was obtained by gel permeation chromatography (GPC). Also, the molecular weight distribution parameter (Mw/Mn) was calculated by further obtaining a number average molecular weight (Mn) by gel permeation chromatography (GPC), and from the ratio of Mw and Mn, i.e., Mw/Mn. The measurement was carried out according to the following procedure and conditions.

1) Pretreatment of Sample

When the sample contained a carboxylic acid group, for example, esterification treatment such as methyl esterification using diazomethane or trimethylsilyl (TMS) diazomethane, etc., was carried out and used for the measurement. Also, when the sample contained a carboxylic acid base, an acid treatment was carried out to modify the carboxylic acid base into a carboxylic acid group, the above-mentioned esterification treatment was carried out and used for the measurement.

2) Preparation of Sample Solution

In 4 mL vial bottle was weighed 3 mg of the sample and 3 mL of o-dichlorobenzene, and after a lid was put thereon with a screw cap and a septum made of Teflon (Registered Trademark), the mixture was shaken at 150° C. for 2 hours using SSG*=7300 type high-temperature shaking device manufactured by Senshu Scientific Co., Ltd. After completion of the shaking, it was visually confirmed that there were no insoluble components.

3) Measurement

To Alliance GPCV2000 type manufactured y Waters Corp., were connected high temperature GPC column Showdex HT-G×1 manufactured by SHOWA DENKO K.K. and Ditto HT-8061×2, and the measurement was carried out using o-dichloro-benzene as an eluent at a temperature of 145° C. and a flow rate: 1.0 mL/min.

4) Calibration Curve

Calibration of the column is carried out by subjecting to measurements of monodispersed polystyrenes (each 0.07 mg/ml solution of S-7300, S-3900, 8-1950, 5-1460, S-1010, 8-565, S-152, S-66.0, S-28.5 and S-5.05) manufactured by SHOWA DENKO K.K., n-eicosane and n-tetracontane under the same conditions as mentioned above, and logarithmic values of the elution time and the molecular weight are approximated by a quaternary equation. Incidentally, for conversion of the polystyrene molecular weight ($M_{PS}$) and the polyethylene molecular weight ($M_{PE}$), the following formula was used.

$$M_{PE}=468 \times M_{PS}$$

(3) Melt Flow Rate (MFR)

The MFR was Measured in Accordance with Table 1-Condition 7 of JIS K-7210 (1999), with the condition at a temperature of 190° C. and a load of 21.18 N (=2.16 kg).

(4) Tensile Test

According to the method (cooling method A) described in JIS K7151 (1995), a sheet having a thickness of 1 mm was prepared from the sample, and tensile tests were carried out under the conditions of a temperature of 23° C. according to JIS K7161 (1994) using 5B shaped small test pieces described in JIS K7162 (1994) which had been prepared by punching out the sheet to measure tensile elasticity, tensile fracture stress and tensile fracture strain. Incidentally, test speed was made 10 mm/min.

(5) Melting Point and Crystallinity

The melting point is shown by the peak temperature of the endothermic curve measured by a differential scanning calorimeter (DSC). For the measurement, DSC (DSC7020) manufactured by SII Nanotechnology Co., Ltd., was used, and the measurement was carried out by the following measurement conditions.

About 5.0 mg of the sample was packed in an aluminum pan, the temperature was raised to 200° C. with 10° C./min, maintained at 200° C. for 5 minutes and then lowered to 30° C. with 10"C/rain, After maintaining at 30° C. for 5 minutes, in the absorption curve when the temperature was raised again with 10° C./min, the maximum peak temperature was made a melting point Tm, and a heat of fusion (ΔH) was obtained from a melt endothermic peak area, and the heat of fusion thereof was divided by the heat of fusion of 293 Jig of the perfect crystal of the high-density polyethylene (HDPE) to obtain the crystallinity (%).

(6) Measurement Method of Amount of Structural Unit Derived from Monomer Having Carboxyl Group and/or Dicarboxylic Anhydride Group and Non-Cyclic Monomer and Number of Branches Per 1,000 Carbons The amount of the structural unit derived from the monomer having a carboxyl group and/or a dicarboxylic anhydride group, and the non-cyclic monomer in the copolymer of the present invention, and a number of branches per 1,000 carbons can be obtained by using $^{13}$C-NMR spectrum. The $^{13}$C-NMR was measured according to the following method.

A sample of 200 to 300 mg was charged in an NMR sample tube having an inner diameter of 10 mmϕ with 2.4 ml of a mixed solvent of o-dichlorobenzene 0.25 ($C_6H_4Cl_2$) and deuterated benzene bromide ($C_6D_5Br$) ($C_6H_4Cl_2/C_6D_5Br=2/1$ (volume ratio)) and hexamethyldisiloxane which is a standard substance of chemical shift and after replacing with nitrogen, the tube was sealed and dissolved by heating to prepare a uniform solution which was made a sample for NMR measurement.

The NMR measurement was carried out using an AV400M type NMR apparatus of Bruker Japan. Co., Ltd., equipped with 10 mmϕ of a cryoprobe at 120° C. The $^{13}$C-NMR was measured with the sample temperature of 120° C., the pulse angle of 90°, the pulse interval of 51.5 seconds, the number of integrations of 512 times or more, by the reverse gate decoupling method.

The chemical shift was set the $^{13}$C signal of hexamethyldisiloxane to 1.98 ppm, and the chemical shift of the signals due to the other $^{13}$C was based on this.

1) Pretreatment of Sample

When the carboxylic acid base was contained in the sample, it was used for the measurement after the carboxylic acid base was modified to a carboxy group by subjecting to acid treatment. Also, when a carboxy group was contained in the sample, for example, esterification treatment such as methyl esterification, etc., using diazomethane or trimethylsilyl (TMS) diazomethane, etc., may be optionally carried out.

2) Calculation of Amount of Structural Unit Derived from Monomer Having Carboxyl Group and/or Dicarboxylic Anhydride Group, and Non-Cyclic Monomer <E/tBA>

The quaternary carbon signal of the t-butyl acrylate group of tBA is detected at 79.6 to 78.8 of $^{13}$C-NMR spectrum. Using these signal intensities, an amount of the comonomer was calculated from the following equation.

Total $tBA$ amount(mol %)=$I(tBA) \times 100/[1(tBA)+I(E)]$

Here, I (tBA) and I (E) are each amount represented by the following equations.

$I(tBA)=I_{79.6 \text{ to } 78.8}$ $I(E)=(I_{180.0 \text{ to } 135.0}+I_{120.0 \text{ to } 5.0}-I(tBA) \times 7)/2$ <E/tBA/NB>

The quaternary carbon signal of the t-butyl acrylate group of WA is detected at 79.6 to 78.8 ppm of $^{13}$C-NMR spectrum and methine carbon signal of NB is detected at 41.9 to 41.1 ppm. Using these signal intensities, an amount of the comonomer was calculated from the following equations.

Total $tBA$ amount(mol %)=$1(tBA) \times 100/[I(tBA)+I(NB)+I(E)]$

Total $NB$ amount(mol %)=$I(NB) \times 100/[I(tBA)+1(NB)+I(E)]$

Here, I (tBA), I (NB) and I (E) are each amount represented by the following equations.

$I(tBA)=I_{79.6 \text{ to } 78.8}$ $I(NB)=I_{41.9 \text{ to } 41.1}/2$ $I(E)=(I_{180.0 \text{ to } 135.0}+I_{120.0 \text{ to } 5.0}-1(NB) \times 7-1(tBA) \times 7)/2$ Incidentally, when the amount of the structural unit of each monomer is indicated by "<0.1" including the inequality sign, it means that it exists as a structural unit in the copolymer, but it is an amount less than 0.1 mol % in consideration of significant figures.

3) Calculation of Number of Branches Per 1,000 Carbons

In the copolymer, there exists an isolated type in which a branch is present alone in the main chain and a composite type (a counter type in which branch and branch face each other via the main chain, a branched-branch type in which branch exists in the branched chain, and a chained type).

The following an example of the structure of ethyl branch. Incidentally, in the example of the counter type, R represents an alkyl grow),

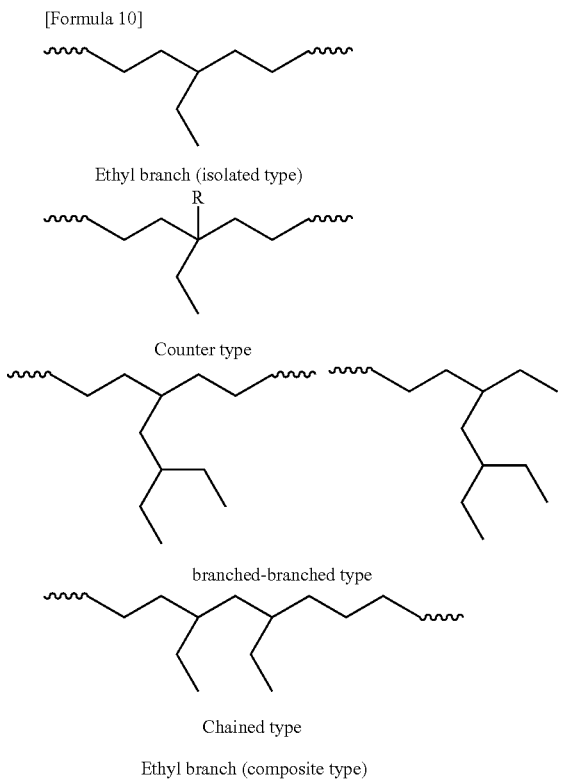

The number of branches per 1,000 carbons is obtained by substituting any of the following I (B1), I (B2) and I (B4) in the term of I (branch) of the following formula. B1 represents a methyl branch, 132 represents an ethyl branch and 134 represents a butyl branch. The number of methyl branches is obtained by using I (B the number of ethyl branches is obtained by using I (B2), and the number of butyl branches is obtained by using I (B4).

Number of branches(number/*per* 1,000 carbons)=$I$(branch)×1000/$I$(total)

Here, I (total), I (B1), I (B2) and I (B4) are amounts shown by the following equations.

$I(\text{total}) = I_{180.0 \ to \ 135.0} + I_{120.0 \ to \ 5.0}$ $I(B1) = (I_{20.0 \ to \ 19.8} + I_{33.2 \ to \ 33.1} + I_{37.5 \ to \ 37.3})/4$ $I(B2) = I_{8.6 \ to \ 7.6} + I_{11.8 \ to \ 10.5}$ $I(B4) = I_{14.3 \ to \ 13.7} - I_{32.2 \ to \ 32.0}$ Here, I indicates an integrated intensity, and the numerical value of subscript of I indicates a range of chemical shift. For example, $I_{180.0 \ to \ 135.0}$ indicates an integrated intensity of $^{13}C$ signal detected between 180.0 ppm and 135.0 ppm.

Attribution was based on Non-Patent Document Macromolecules 1984, 17, 1756-1761, Macromolecules 1979, 12, 41.

Incidentally, when the number of each branch is indicated by "<0.1" including the inequality sign, it means that it exists as a structural unit in the copolymer, but it is an amount less than 0.1 mol % in consideration of significant figures. Also, not detected means less than the detection limit.

(7) Infrared Absorption Spectrum

A sample is melted at 180'C for 3 minutes, and subjected to compression molding to prepare a film having a thickness of about 50 μm. This film was analyzed by Fourier transform infrared spectroscopy to obtain infrared absorption spectrum.

Product name: FT/IR-6100 manufactured by JASCO Corporation

Measurement means: Transmission method

Detector: TGS (Triglycine sulfate)

Number of integrations: 16 to 512 times

Resolution: 4.0 cm$^{-1}$

Measurement wavelength: 5000 to 500 cm$^{-1}$ (8) Tensile Impact Strength

1) Preparation Method of Tensile Impact Strength Test Sample

A sample was charged in a mold for heat press with a thickness of 1 mm, preheated in a hot press machine at a surface temperature of 180° C. for 5 minutes, the sample was melted and a residual gas in the sample was degassed by repeating pressurization and depressurization, and the sample was further pressurized at 4.9 MPa and maintained for 5 minutes. Thereafter, it was gradually cooled at a rate of 10° C./min in the state of applying a pressure of 4.9 MPa, and when the temperature lowered to around room temperature, then, the molded plate was taken out from the mold. The state of the obtained molded plate was adjusted under the environment of a temperature of 23±2° C., a humidity of 50±5° C. for 48 hours or longer. From the press plate after state adjustment, a test piece in the shape of ASTM D1822 Type-S was punched out to make it a tensile impact strength test sample.

2) Tensile Impact Strength Test Conditions

Using the above-mentioned test piece, tensile impact strength was measured with reference to the B method of JIS K 7160-1996. Incidentally, the only difference from JIS K 7160-1996 is the shape of the test piece. With regard to other measurement conditions, etc., the test was carried out in accordance with the method of JIS K 7160-1996.

(9) Adhesive Strength

The obtained laminated body was cut to a width of 15 mm along the molding flow direction, and adhesive strength was measured by subjecting to T-peeling at a rate of 50 mm/min using a Tensilon (manufactured by TOYO SEIKI Co., Ltd.). The unit of adhesive strength was shown by N/15 mm.

(10) Hot Tack Strength

Measurement of hot tack strength was carried out using hot tack tester SL-10 manufactured by Lakotool, in accordance with ASTM F1921-98, under the conditions of a sealing temperature of 110 to 140° C., a sealing pressure of 0.414 MPa, a sealing time of 1,000 ms and a peeling rate of 200 cm/min. The peeling strength at 500 ms after completion of the sealing was made hot tack strength.

Example 1

<Synthesis of Metal Complex>

(1) Synthesis of B-27DM/Ni Complex

As the 13-27DM/Ni complex, in accordance with Synthetic Example 4 described in WO 2010/050256, the following 2-bis(2,6-dimethoxyphenyl)phosphano-6-pentafluorophenylphenol ligand (B-27DM) was used. In accordance with Example 1 of WO 2010/050256, a nickel complex (B-27DM/Ni) in which B-27DM and Ni(COD)$_2$ are reacted with 1:1 was synthesized using bis(1,5-cyclooctadiene) nickel(0) (which is referred to as Ni(COD)$_2$).

[Formula 11]

B-27DM

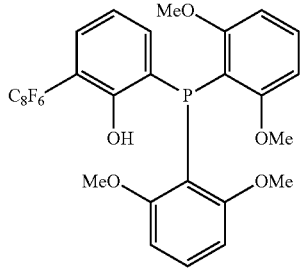

(Production Example 1): Production of Ionomer Base Resin Precursor

An ethylene/tBu acrylate/norbornene copolymer was produced using a transition metal complex (B-27DM/Ni complex or 13423/Ni complex). With reference to Production Example 1 or Production Example 3 described in JP 2016-79408A, production of the copolymer was carried out, and optionally changed production conditions and results of production such as a kind of a metal catalyst, an amount of the metal catalyst, an amount of trioctyl aluminum (TWA), an amount of toluene, a type of comonomer, an amount of comonomer, a partial pressure of ethylene, a polymerization temperature, a polymerization time, etc., are shown in Table 1, and physical properties of the obtained copolymer are shown in Table 2.

TABLE 1

E/tBA/χ copolymerization results

| | Amount of metal complex | Amount of complex mmol | TNOA mmol | Toluene L | Comonomer 1 | Comonomer 2 | Comonomer 1 Concentration mmol/L |
|---|---|---|---|---|---|---|---|
| Production example 1 | B-27DM/Ni | 1000 | 225 | 1000 | t-Butyl acrylate | 2-Norbornene | 230 |

| | Comonomer | Polmerization conditions | | | | |
|---|---|---|---|---|---|---|
| | Comonomer 2 Concentration mmol/L | Ethylene partial pressure MPa | Temperature ° C. | Time min | Yield g | Catalyst efficiency g/mol |
| Production example 1 | 210 | 0.8 | 85 | 330 | 117000 | 1.2E+05 |

TABLE 2

E/tBA/X copolymerization results

| | Comonomer 1 | Comonomer 2 | Comonomer 1 Content mol % | Comonomer 2 Content mol % | Melting point Tm ° C. | Crystallinity % | Weight average molecular weight Mw*10$^{-4}$ |
|---|---|---|---|---|---|---|---|
| Production example 1 | t-Butyl acrylate | 2-Norbornene | 5.1 | 2.9 | 80.5 | 14.6 | 3.8 |

| | Molecular weight distribution parameter Mw/Mn | Methyl branch amount Number/-1,000C | Ethyl branch amount Number/-1,000C | Butyl branch amount Number/-1,000C |
|---|---|---|---|---|
| Production example 1 | 2.3 | 0.5 | not detected | not detected |

<Production of Ionomer Base Resin>

In an autoclave having an inner volume of 1.6 m³ equipped with a stirring blade and made of SUS316L were charged 100 kg of the obtained copolymer of Production Example 1 with 2.0 kg of para-toluenesulfonic acid monohydrate and 173 L of toluene, and the mixture was stirred at 105° C. for 4 hours. After adding 173 L of ion-exchanged water thereto, stirring the same and allowing to stand, the aqueous layer was taken out. After that, addition and taken out of the ion-exchanged water were repeatedly carried out until the pH of the taken out aqueous layer became 5 or more. The remaining solution was charged in a twin-screw extruder (L/D=42) equipped with 42 mmφ vent device, and the solvent was distilled off by drawing the vent into a vacuum. Further, the resin excluded continuously from the die at the tip of the extruder in the form of strands was cooled in water and cut with a cutter to obtain pellets of the resin.

In the IR spectrum of the obtained resin, disappearance of the peak near 850 cm derived from the tBu group and decrease of the peak near 1730 cm$^{-1}$ derived from an ester of a carbonyl group, and increase of the peak near 1700 cm$^{-1}$ derived from a carbonyl group of the carboxylic acid (dimer) were observed.

According to this, decomposition of the t-Bu ester and formation of the carboxylic acid were confirmed to obtain an ionomer base resin 1. The physical properties of the obtained resin were shown in Table 3 and Table 4, In the following Table, "E", "AA" and "NB" are each abbreviations of "ethylene", "acrylic acid" and "norbornene" as the structural units contained in the base resin, respectively.

TABLE 3

E/AA/X base resin results

| Base resin | Resin composition A/B/C mol/mol/mol | MFR 190 deg. 2.16 kg q/10 min | Melting point Tm ° C. | Crystallinity % | Structural unit amount [Z] [B] + [C] mol % | -3.74 × [Z] + 130 | Phase angle δ (G* = 0.1 MPa) ° | Methyl branch amount Number/-1,000C | Ethyl branch amount Number/-1,000C | Butyl branch amount Number/-1,000C |
|---|---|---|---|---|---|---|---|---|---|---|
| Resin 1 | E/AA/NB = 92.0/5.1/2.9 | 17 | 84 | 20 | 8 | 100 | 62 | 0.5 | not detected | not detected |

TABLE 4

E/AA/X base resin results

| Base resin | Resin composition A/B/C mol/mol/mol | Tensile elasticity MPa | Tensile fracture stress MPa | Tensile fracture elongation % | Tensile impact strength kJ/m2 |
|---|---|---|---|---|---|
| Resin 1 | E/AA/NB = 92.0/5.1/2.9 | 88 | 15 | 477 | 764 |

<Production of Ionomer>
1) Preparation of Zn Ion Supply Source

To a twin-screw extruder (L/D=64) equipped with a 26 rani vent device manufacture by Toshiba Machine Co., Ltd., were continuously charged so that the formulation ratio became 54.5 wt % of an ethylene/methacrylic acid (MAA) copolymer (available from. Dow-Mitsui Chemicals Co., Ltd., brand: Nucrel N105011), 45 wt % of zinc oxide and 0.5 wt % of zinc stearate, and extrusion was carried out under kneading conditions of a barrel set temperature of 150° C. and a screw rotation number of 150 rpm while removing gas and water generated during the kneading from the vent portion by a vacuum pump. Further, the resin continuously extruded from the die at the tip of the extruder in the form of strands was cooled in water and cut with a cutter to obtain pellets of the Zn ion supply source.

2): Preparation of Ionomer

To a twin-screw extruder (L/D=65) equipped with a 26 mmφ vent device manufacture by Toshiba Machine Co., Ltd., were continuously charged so that the formulation ratio of the resin 1 and the Zn ion supply source became a desired degree of neutralization, and extrusion was carried out under kneading conditions of a barrel set temperature of 200° C. and a screw rotation number of 150 rpm while injecting water with a ratio of 4 parts based on 100 parts of the charged resin and removing gas and water generated during the kneading from the vent portion by a vacuum pump. Further, the resin continuously extruded from the die at the tip of the extruder in the form of strands was cooled in water and cut with a cutter to obtain pellets of the ionomer.

In the IR spectrum of the obtained resin, the peak near 1700 cm$^{-1}$ derived from a carbonyl group of the carboxylic acid (dimer) decreased and the peak near 1560 cm-1 derived from a carbonyl group of the carboxylic acid base increased. It was confirmed that an ionomer having a desired degree of neutralization could be prepared from the decreased amount of the peak near 1700 cm$^{-1}$ derived from a carbonyl group of the carboxylic acid (dialer). Physical properties of the obtained ionomer are shown in Table 5 and Table 6.

TABLE 5

Ionomer resin results

| | Base resin | Resin composition A/B/C mol/mol/mol | Degree of neutralization Na+/(M)AA mol % | Degree of neutralization 2 × Zn2+/(M)AA mol % | MFR 190 deg. 2.16 kg g/10 min | Melting point Tm °C. | Phase angle δ (G* = 0.1 MPa) ° |
|---|---|---|---|---|---|---|---|
| Ionomer 1 | Resin 1 | E/AA/NB = 92.0/5.1/2.9 | | 10 | 5 | 85 | 61 |

TABLE 6

Ionomer resin results

| | Base resin | Resin composition A/B/C mol/mol/mol | Degree of neutralization Na+/(M)AA mol % | Degree of neutralization 2 × Zn2+/(M)AA mol % | Tensile elasticity MPa | Tensile fracture stress MPa | Tensile fracture elongation % | Tensile impact strength KJ/m2 |
|---|---|---|---|---|---|---|---|---|
| Ionomer 1 | Resin 1 | E/AA/NB = 92.0/5.1/2.9 | | 10 | 104 | 43 | 433 | 1020 |

<Production of Laminated Body Using Ionomer>

A base material in which a biaxially stretched PET having a thickness of 12 μm and an aluminum foil having a thickness of 7 μm had been laminated previously by dry lamination was prepared, Extrusion lamination molding was carried out to the aluminum surface of the base material using the ionomer 1 with a thickness of 25 μm and an extrusion laminating device having a 40 mmφ extruder and a T-die with a surface length of 300 mm and a lip gap of 0.8 mm under the conditions of an air gap of 90 mm, a molding resin temperature of 280° C., a cooling roll temperature of 20° C. and a line speed of 10 m/min to obtain a laminated body. Extrusion lamination processing conditions, and aluminum adhesive strength and hot tack strength of the obtained laminated body are shown in Table 9.

Example 2

<Production of Polymer Composition Using Ionomer>

After uniformly mixing 70% by weight of the ionomer 1 and 30% by weight of an LIRE resin (MFR=5, density=0.918 g/cm³ and Mw/Mn=11) polymerized by the autoclave high-pressure method by a mixer for about 30 seconds, kneading was carried out using a 30 mmφ single-screw kneading extruder at 170° C. to obtain pellets of a polymer composition 1. MFR of the obtained polymer composition 1 was 6.0 g/10 min.

<Preparation of Laminated Body Using Polymer Composition which Uses Ionomer>

In the same manner as in Example 1 except for using the obtained polymer composition 1 in place of the ionomer 1, extrusion lamination molding was carried out with a thickness of 25 μm to obtain a laminated body. Extrusion lamination processing conditions, and aluminum adhesive strength and hot tack strength of the obtained laminated body are shown in Table 9.

[Comparative Example 1]: E/MAA Base Binary Ionomer

Air ionomer resin (available from Dow-Mitsui Chemicals Co., Ltd., brand: HIMILAN HIM1652) which is a copolymer of ethylene, methacrylic acid and zinc methacrylate and produced by a high-pressure radial method process was used as a reference ionomer. Physical properties are shown in Table 7 and Table 8.

TABLE 7

| | Resin | Resin composition A/B mol/mol/mol | Degree of neutralization Na+/(M)AA mol % | Degree of neutralization 2 × Zn2+/(M)AA mol % | MFR 190 deg, 2.16 kg g/10 min | Melting point Tm °C. | Phase angle δ (G* = 0.1 MPa) ° |
|---|---|---|---|---|---|---|---|
| Comparative example 1 | HIM1652 | E/MAA = 96.9/3.1 | | 17 | 5.5 | 97 | 41 |

TABLE 8

| | Base resin | Resin composition A/B/C mol/mol/mol | Degree of neutralization Na+/(M)AA mol % | Degree of neutralization 2 × Zn2+/(M)AA mol % | Tensile elasticity MPa | Tensile fracture stress MPa | Tensile fracture elongation % | Tensile impact strength KJ/m2 |
|---|---|---|---|---|---|---|---|---|
| Comparative example 1 | HIM1652 | E/MAA = 96.9/3.1 | | 17 | 126 | 28 | 445 | 508 |

<Preparation of Laminated Body Using Polymer Composition which Uses Ionomer>

Figure 3:
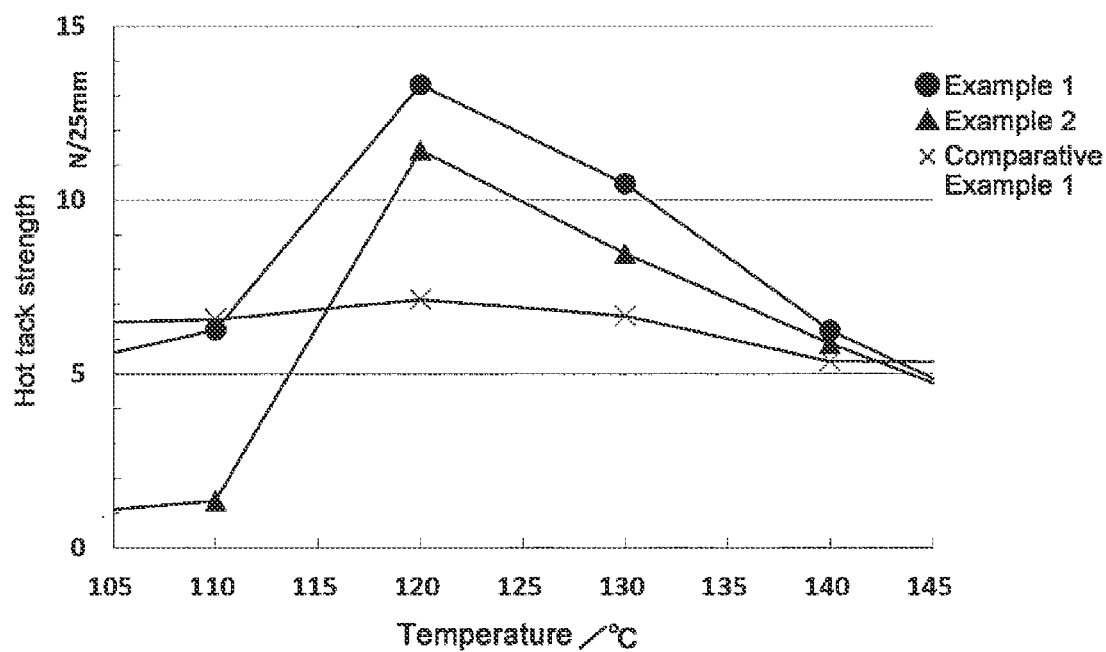
FIG. 3 is a graph showing hot tack strength with respect to the temperature of Examples 1 and 2, and Comparative Example 1.

In the same manner as in Example 1 except for using HIM1652 in place of the ionomer 1, extrusion lamination molding was carried out with a thickness of 25 μm to obtain a laminated body. Extrusion lamination processing conditions, and aluminum adhesive strength and hot tack strength of the obtained laminated body are shown in Table 9. Also, the relationship between the temperature and the hot tack strength are graphed is shown in FIG. 3.

TABLE 9

| | | | Example 1 | Example 2 | Comparative example 1 |
|---|---|---|---|---|---|
| Formulation | Ionomer 1 | weight % | 100 | 70 | |
| | LDPE | weight % | | 30 | |
| | HIM1652 | weight % | | | 100 |
| | MFR | g/10 min | 5 | 6 | 5.5 |
| Lami processing conditions | Processing temperature | ° C. | 280 | 280 | 280 |
| | Screw rotation number | rpm | 20 | 18 | 18 |
| | Drawing speed | m/min | 10 | 10 | 10 |
| | Lami thickness | μm | 25 | 25 | 25 |
| | Neck-in | mm | 129 | 85 | 43 |
| | Adhesion strength to aluminum | N/15 mm | 3.5 | 0.4 | 3.1 |
| Hot tack strength | 110° C. | N/25 mm | 6.3 | 1.3 | 6.6 |
| | 120° C. | N/25 mm | 13.3 | 11.4 | 7.1 |
| | 130° C. | N/25 mm | 10.5 | 8.4 | 6.7 |
| | 140° C. | N/25 mm | 6.2 | 5.9 | 5.4 |

Consideration of Results of Example and Comparative Example

From Table 9 and FIG. 3, it can be understood that Examples have very high hot tack strength at 120 to 130° C. and excellent in hot tack property as compared with Comparative Example. This is considered that the ethylene-based ionomers of the present invention have a substantially linear state molecular structure different from the conventional ionomer.

Utilizabilty in Industry

The polymer composition for lamination using the ionomer of the present invention is excellent in mechanical properties and hot tack property as compared with the ionomers obtained by the conventional high-pressure radical polymerization method, so that the laminated body using the same is excellent in sealing properties and can be usefully used as a packaging material, etc.

The invention claimed is:

1. A polymer composition for lamination characterized in that the composition consists of
   (X1) 100 to 60% by weight of an ionomer characterized in that the ionomer comprises a copolymer (P) containing a structural unit (A) derived from ethylene and/or an α-olefin having 3 to 20 carbon atoms and a structural unit (B) derived from a monomer having a carboxyl group and/or a dicarboxylic anhydride group as essential constitutional units, and further containing, other than the structural unit (A) and the structural unit (B), a structural unit (C) which is a compound having one or more carbon-carbon double bond in a molecular structure, and at least a part of a carboxyl group and/or a dicarboxylic anhydride group being converted into a metal-containing carboxylic acid salt containing at least one kind of a metal ion(s) selected from Group 1, Group 2 or Group 12 of the periodic table, and a phase angle δ of the ionomer at an absolute value G*=0.1 MPa of a complex modulus of elasticity measured by a rotary rheometer is a range of 50 degrees to 75 degrees, and
   (X2) 40 to 0% by weight of an ethylene-based copolymer containing ethylene by high-pressure radical polymerization as an essential monomer, and has a melt flow rate of 1.0 to 100 g/10 min.

2. The polymer composition for lamination according to claim 1 characterized in that the structural unit (C) in the copolymer (P) is a non-cyclic monomer represented by the following general formula (1) or a cyclic monomer represented by the following general formula (2):

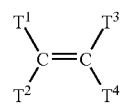

(1)

in the general formula (1), $T^1$ to $T^3$ each independently represents a substituent selected from the group consisting of a hydrogen atom, a hydrocarbon group having 1 to 20 carbon atoms, a hydrocarbon group having 1 to 20 carbon atoms substituted by a hydroxyl group, a hydrocarbon group having 2 to 20 carbon atoms substituted by an alkoxy group having 1 to 20 carbon atoms, a hydrocarbon group having 3 to 20 carbon atoms substituted by an ester group having 2 to 20 carbon atoms, a hydrocarbon group having 1 to 20 carbon atoms substituted by a halogen atom, an alkoxy group having 1 to 20 carbon atoms, an aryl group having 6 to 20 carbon atoms, an ester group having 2 to 20 carbon atoms, a silyl group having 3 to 20 carbon atoms, a halogen atom and a cyano group, and $T^4$ represents a substituent selected from the group consisting of a hydrocarbon group having 1 to 20 carbon atoms substituted by a hydroxyl group, a hydrocarbon group having 2 to 20 carbon atoms substituted by an alkoxy group having 1 to 20 carbon atoms, a hydrocarbon group having 3 to 20 carbon atoms substituted by an ester group having 2 to 20 carbon atoms, a hydrocarbon group having 1 to 20 carbon atoms substituted by a halogen atom, an alkoxy group having 1 to 20 carbon atoms, an aryl group having 6 to 20 carbon atoms, an ester group having 2 to 20 carbon atoms, a silyl group having 3 to 20 carbon atoms, a halogen atom and a cyano group,

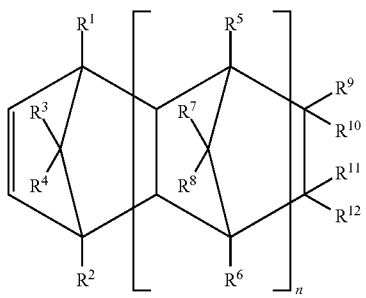

(2)

in the general formula (2), $R^1$ to $R^{12}$ each may be the same or different from each other, and each is selected from the group consisting of a hydrogen atom, a halogen atom and a hydrocarbon group having 1 to 20 carbon atoms, $R^9$ and $R^{10}$, and, $R^{11}$ and $R^{12}$ may be each integrated to form a divalent organic group, and $R^9$ or $R^{10}$, and $R^{11}$ or $R^{12}$ may form a ring with each other, and n indicates 0 or a positive integer, and when n is 2 or more, $R^5$ to $R^8$ may be the same or different from each other in each repeating unit.

3. The polymer composition for lamination according to claim 2 characterized in that the structural unit (C) in the copolymer (P) is the non-cyclic monomer represented by the general formula (1).

4. The polymer composition for lamination according to claim 2 characterized in that the structural unit (C) in the copolymer (P) is the cyclic monomer represented by the general formula (2).

5. The polymer composition for lamination according to claim 1 characterized in that a number of methyl branches calculated by $^{13}$C-NMR of the copolymer (P) is 50 or less per 1,000 carbons.

6. The polymer composition for lamination according to claim 1 characterized in that a number of methyl branches calculated by $^{13}$C-NMR of the copolymer (P) is 5 or less per 1,000 carbons.

7. The polymer composition for lamination according to claim 1 characterized in that the copolymer (P) contains 2 to 20 mol % of the structural unit (B) in the copolymer.

8. The polymer composition for lamination according to claim 1 characterized in that the structural unit (A) is a structural unit derived from ethylene.

9. The polymer composition for lamination according to claim 1 characterized in that the copolymer (P) is produced by using a transition metal catalyst containing a transition metal(s) of Group 8 to 11 of the periodic table.

10. The polymer composition for lamination according to claim 9 characterized in that the transition metal catalyst is a transition metal catalyst comprising phosphorus sulfonic acid or phosphorus phenol ligand and nickel or palladium.

11. The polymer composition for lamination according to claim 1 characterized in that the (X2) ethylene-based copolymer by high-pressure radical polymerization is an ethylene homopolymer.

12. A laminated body which is a laminated body constituted by at least a first layer composed of a base material layer and a second layer composed of a sealant layer, wherein the sealant layer comprises the polymer composition for lamination according to claim 1.

* * * * *